United States Patent
Luan et al.

(10) Patent No.: US 10,580,179 B2
(45) Date of Patent: Mar. 3, 2020

(54) METHOD AND APPARATUS FOR PROCESSING VIDEO IMAGE AND ELECTRONIC DEVICE

(71) Applicant: Beijing SenseTime Technology Development Co., Ltd., Beijing (CN)

(72) Inventors: Qing Luan, Beijing (CN); Jianping Shi, Beijing (CN)

(73) Assignee: Beijing SenseTime Technology Development Co., Ltd., Beijing (CN)

(*) Notice: Subject to any disclaimer, the term of this patent is extended or adjusted under 35 U.S.C. 154(b) by 30 days.

(21) Appl. No.: 15/845,802

(22) Filed: Dec. 18, 2017

(65) Prior Publication Data
US 2018/0122114 A1    May 3, 2018

Related U.S. Application Data

(63) Continuation of application No. PCT/CN2017/098216, filed on Aug. 21, 2017.

(30) Foreign Application Priority Data

Aug. 19, 2016  (CN) .......................... 2016 1 0694601
Aug. 19, 2016  (CN) .......................... 2016 1 0697316

(51) Int. Cl.
*G06T 11/40*      (2006.01)
*H04N 21/81*     (2011.01)
(Continued)

(52) U.S. Cl.
CPC ............ *G06T 11/40* (2013.01); *G06N 3/0454* (2013.01); *G06N 3/08* (2013.01); *G06T 7/11* (2017.01);
(Continued)

(58) Field of Classification Search
None
See application file for complete search history.

(56) References Cited

U.S. PATENT DOCUMENTS

| 10,242,285 | B2* | 3/2019 | Thrasher | ................. G06T 7/187 |
| 2008/0033801 | A1* | 2/2008 | McKenna | .............. G06Q 30/02 |
| | | | | 705/14.4 |

(Continued)

FOREIGN PATENT DOCUMENTS

| CN | 103024479 A | 4/2013 |
| CN | 104766229 A | 7/2015 |

(Continued)

OTHER PUBLICATIONS

L. Hongtao, et al., "Applications of Deep Convolutional Neural Network in Computer Vision", Journal of Data Acquisition and Processing, vol. 31, No. 1, Jan. 2016, pp. 1-17.

*Primary Examiner* — James A Thompson
(74) *Attorney, Agent, or Firm* — Blank Rome LLP

(57) ABSTRACT

Embodiments of the present application provide a method and an apparatus for processing a video image and an electronic device, relating to the field of artificial intelligent technologies, wherein the method includes: obtaining a video image to be processed and a business object to be displayed; determining a background area of the video image; and drawing the business object in the background area of the video image by means of computer graphics. The embodiments of the present application may realize display of the business object in the background area of the video image, so that the business object may be prevented from blocking a foreground area favorably, the normal video viewing experience of an audience is not influenced, the dislike of the audience is not easy to be aroused, and an expected display effect of the business object may be achieved favorably.

19 Claims, 5 Drawing Sheets

(51) Int. Cl.

| | | |
|---|---|---|
| *G11B 27/036* | (2006.01) | |
| *G06T 7/11* | (2017.01) | |
| *G06T 11/00* | (2006.01) | |
| *G06T 7/194* | (2017.01) | |
| *G06T 7/73* | (2017.01) | |
| *H04N 21/44* | (2011.01) | |
| *H04N 21/466* | (2011.01) | |
| *H04N 21/234* | (2011.01) | |
| *G06N 3/08* | (2006.01) | |
| *G06N 3/04* | (2006.01) | |

(52) U.S. Cl.
 CPC ............... *G06T 7/194* (2017.01); *G06T 7/73* (2017.01); *G06T 11/00* (2013.01); *G11B 27/036* (2013.01); *H04N 21/23418* (2013.01); *H04N 21/23424* (2013.01); *H04N 21/44008* (2013.01); *H04N 21/44016* (2013.01); *H04N 21/4666* (2013.01); *H04N 21/812* (2013.01); *G06N 3/0481* (2013.01); *G06T 2207/10016* (2013.01); *G06T 2207/20081* (2013.01); *G06T 2207/20084* (2013.01)

(56) References Cited

U.S. PATENT DOCUMENTS

| | | | |
|---|---|---|---|
| 2015/0304698 A1* | 10/2015 | Redol | .................. H04N 21/854 725/23 |
| 2016/0212455 A1* | 7/2016 | Manna | .................. G06Q 30/02 |
| 2017/0024629 A1* | 1/2017 | Thrasher | .................. G06T 7/187 |
| 2017/0206416 A1* | 7/2017 | Chen | .................. G06K 9/00671 |
| 2017/0270674 A1* | 9/2017 | Shrivastava | ....... G06K 9/00771 |

FOREIGN PATENT DOCUMENTS

| | | |
|---|---|---|
| CN | 105578255 A | 5/2016 |
| CN | 105872838 A | 8/2016 |

* cited by examiner

METHOD AND APPARATUS FOR PROCESSING VIDEO IMAGE AND ELECTRONIC DEVICE

CROSS-REFERENCE TO RELATED APPLICATIONS

The present application is a continuation of PCT/CN2017/098216 filed on Aug. 21, 2017, which claims priorities to Chinese patent application No. CN201610694814.9 filed on Aug. 19, 2016, and entitled "Method and Apparatus for Image Foreground-Background Segmentation, Network Model Training and Image Processing," Chinese patent application No. CN201610694601.6 filed on Aug. 19, 2016, and entitled "Method, Apparatus and Terminal Device for Processing Video Image," and Chinese patent application No. CN201610697316.X filed on Aug. 19, 2016, and entitled "Method, Apparatus and Terminal Device for Processing Video Image," the entire contents of which are incorporated herein by reference.

TECHNICAL FIELD

Embodiments of the present application relate to the artificial intelligent technologies, in particular to a method and an apparatus for processing a video image and an electronic device.

BACKGROUND

With the development of the Internet technologies, more and more people use the Internet to watch videos, and Internet videos provide business opportunities for many new businesses. The Internet videos have become an important business traffic entrance, and are considered as excellent resources for advertisement insertion.

Existing video advertisements are mainly realized by way of placement. A common approach of placement is to insert advertisements with fixed time duration before a video is played, or at a certain time point during the video playback, or to place advertisements at a fixed position in a video playback area and its surrounding.

SUMMARY

The embodiments of the present application provide a technical solution for processing a video image.

According to one aspect of the embodiments of the present application, a method for processing a video image is provided, including: obtaining a video image to be processed and a business object to be displayed; determining a background area of the video image; and drawing the business object in the background area of the video image by means of computer graphics.

According to another aspect of the embodiments of the present application, an apparatus for processing a video image is further provided, including: an obtaining module for obtaining the video image to be processed and the business object to be displayed; a background area determining module for determining the background area of the video image; and a drawing module for drawing the business object in the background area of the video image by means of computer graphics.

According to another aspect of the embodiments of the present application, an electronic device is further provided, including: a processor, a memory, a communications interface and a communication bus, wherein the processor, the memory and the communications interface complete communication between each other through the communication bus; and the memory is configured for storing an executable instruction that enables the processor to execute the operation corresponding to the method for processing the video image as described in any embodiment of the present application.

According to another aspect of the embodiments of the present application, another electronic device is further provided, including: a processor and the apparatus for processing the video image as described in any embodiment of the present application.

When the processor operates the apparatus for processing the video image, a unit in the apparatus for processing the video image in any embodiment of the present application is operated.

According to another aspect of the embodiments of the present application, a computer program is further provided, including: a computer readable code, and when the computer readable code is operated on the device, the processor in the device executes the instruction for implementing each step of the method for processing the video image as described in any embodiment of the present application.

According to another aspect of the embodiments of the present application, a computer readable storage medium is further provided to store a computer readable instruction, and when the computer readable instruction is executed, the operation of each step of the method for processing the video image as described in any embodiment of the present application is implemented.

According to the technical solution provided by the embodiments of the present application, by obtaining the video image to be processed and the business object to be displayed, determining the background area of the video image to be processed, and drawing the business object in the background area of the video image by means of computer graphics, display of the business object in the background area of the video image is realized, the business object may be prevented from blocking a foreground area, normal video watching experience of an audience is not influenced, dislike of the audience is not easily aroused, which is beneficial to realize an expected display effect of the business object.

Hereinafter, the technical solution of the present application is further described in detail in conjunction with the drawings and embodiments.

BRIEF DESCRIPTION OF THE DRAWINGS

The drawings, which are part of the specification, describe the embodiments of the present application, and together with the description, are used to explain principles of the present application.

With reference to the drawings, the present application may be more clearly understood according to the following detailed description.

DETAILED DESCRIPTION OF EMBODIMENTS

Figure 1:
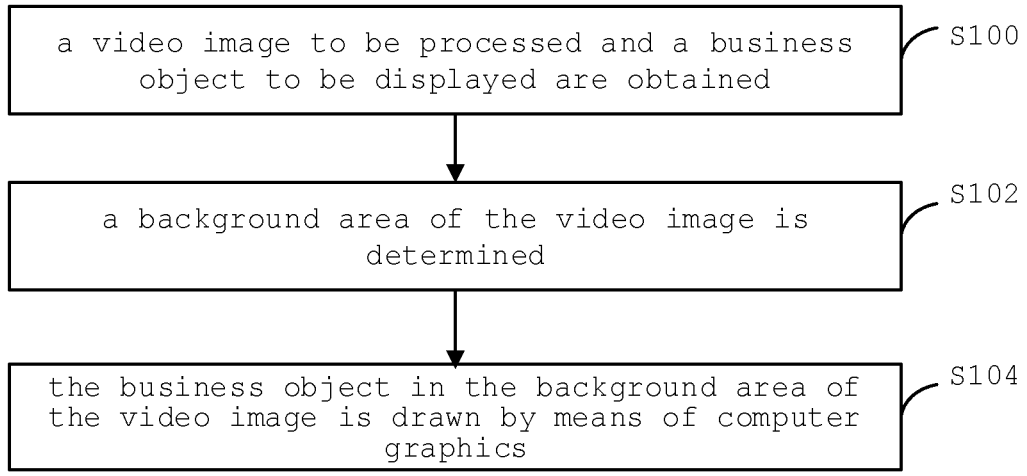
FIG. 1 is a flow diagram of one embodiment of the method for processing the video image according to the embodiments of the present application.

Respective exemplary embodiments of the present application will be described in detail now with reference to the drawings. It should be noted that, unless otherwise specified, relative arrangements of components and procedures, numerical expressions and values described in these embodiments do not limit the scope of the present application.

Meanwhile, it should be understood that, in order to facilitate description, sizes of respective parts shown in the drawings are not drawn according to an actual proportional relationship.

The description of at least one exemplary embodiment hereinafter is just illustrative actually, and severs by no means as any limitation to the present application and an application or usage thereof.

Technologies, methods and devices known by those of ordinary skills in related arts may not be discussed in detail, but in appropriate situations, the technologies, methods and devices should be regarded as part of the specification.

It should be noted that similar labels and letters in the following drawings represent similar terms, and hence once a certain term is defined in a drawing, there is no need of further discussing this term in the follow-up drawings.

Those skilled in the art may appreciate that the terms such as "first", "second" and so on in the embodiments of the present application are just used to distinguish different steps, devices or modules etc., and these terms represent neither any specific technical meaning, nor an inevitable logic sequence of them.

The embodiments of the present application may be applied to an electronic device, such as a terminal device, a computer system, a server, etc., and may be operated together with many other universal or dedicated computing system environments or configurations. Examples of well-known terminal devices, computing systems, environments and/or configurations suitable for being used together with the electronic device, such as the terminal device, the computer system, a server, etc., include but not limited to a personal computer system, a server computer system, a thin client, a thick client, a handhold or laptop device, a microprocessor-based system, a set-top box, a programmable consumable electronic product, a network personal computer, a small-scale computer system, a large-scale computer system, a distributed cloud computing technical environment including any system described above, etc.

The electronic device, such as the terminal device, the computer system, the server, etc., may be described under an ordinary context of a computer system executable instruction (such as a program module) executed by the computer system. Usually, a program module may include a routine, a program, a target program, a component, a logic, a data structure, etc., which execute a specified task or realize specified abstract data type. The computer system/server may be implemented in a distributed cloud computing environment in which a task is executed by a remote processing device linked though a communication network. In the distributed cloud computing environment, a program module may be positioned on a local or remote computing system storage medium including a storage device.

FIG. 1 is a flow diagram of one embodiment of the method for processing the video image according to the embodiments of the present application. The method for processing the video image according to the respective embodiments of the present application may be exemplarily executed by any device with functions of data acquisition, data processing and data transmission, including, but not limited to, an electronic device, such as a terminal device, a personal computer (PC) and a server. The embodiments of the present application do not set limitation to the device for implementing the method for processing the video image in the embodiments of the present application. Referring to FIG. 1, the method for processing the video image in the present embodiment includes:

Step S100: a video image to be processed and a business object to be displayed are obtained.

For example, in a live broadcasting scenario, a video image being displayed, namely a live video image, is obtained. As another example, in a video recording scenario, a video image currently being recorded is obtained. As yet another example, in a recorded video, a video image currently being played is obtained. In addition, the video image in the respective embodiments of the present disclosure may also be a static image. The present embodiment does not limit types, acquisition approaches and concrete acquisition means of the video image.

In addition, the respective embodiments of the present application take processing on one video image as an example, but those skilled in the art should understand that a plurality of video images or a video image sequence in a video stream may be processed with reference to the video image processing in the respective embodiments of the present application.

In the respective embodiments of the present application, the business object to be displayed is an object which is established according to certain business needs and may be displayed in the video image. In an optional example, the business object, for example, may include, but not limited to, any one or more of the following: a specific effect (which may be called as a target specific effect) including semantic information (e.g., advertisement information, entertainment information, weather forecast information, traffic forecast information, pet information and/or the like), a video (which may be called as a target video), an image (which may be called as a target image) and the like, wherein the target specific effect, for example, may be a specific effect in a three-dimensional (3D) form, e.g., a 3D advertising specific effect such as an advertisement displayed in a form of 3D specific effect and/or the like. The target specific effect may also be a poster in a two-dimensional (2D) form, e.g., a 2D advertising specific effect such as an advertisement displayed in a form of a poster and/or the like. The target specific effect may also be a particle specific effect and the like. For example, the target video may be a scenario video, either a recorded scenario video or a live scenario video. The target video may also be a sports video, either a recorded sports video or a live sports video. However, the target video is not limited to those examples, the business object in other form is also applicable to the technical solution of each embodiment of the present application, e.g., an application (APP) or a text description or introduction of the application, or an object (e.g., an electronic pet) in a certain form that is interacting with a video audience, etc., and the present embodiment does not limit the specific form and content of the target video.

In each embodiment of the present application, a process of obtaining the business object to be displayed may be executed simultaneously with the process of obtaining the video image to be processed, or executed before or after the process of obtaining the video image to be processed. The present embodiment does not limit the execution sequence of the process of obtaining the business object to be displayed in the present embodiment.

In an optional example, Step S100 may be executed by a processor by calling a corresponding instruction stored in the memory, or executed by the obtaining module 600 operated by the processor.

Step S102: a background area of the video image is determined.

In an optional example of each embodiment of the present application, during the process of determining the background area of the video image, a foreground area and a background area of the video image may be detected from the video image; or, the background area of the video image may be directly detected from the video image; or, the foreground area of the video image may be detected from the video image, and then an area other than the foreground area in the video image is determined as the background area of the video image. The present embodiment does not limit the technical means for determining the foreground area of the video image.

In each embodiment of the present application, in a live video scenario, the foreground area of a live video image includes an area in which a human character is located, and the background area of the live video image includes at least part area other than the area in which the human character is located.

In an optional example, Step S102 may be executed by a processor by calling a corresponding instruction stored in a memory, or executed by a background area determining module 602 operated by a processor.

Step S104: the business object in the background area of the video image is drawn by means of computer graphics.

After the background area of the video image is determined, the business object is drawn in the background area of the video image by means of computer graphics, for example, the business object may be drawn in the background area of the video image by computer graphics, namely the business object is drawn in the whole background area or part of the background area of the video image by means of computer graphics.

Drawing of the business object in the determined background area by computer graphics may be implemented by way of appropriate computer graphic and image drawing or rendering and/or the like, for example, it may include, but not limited to, carrying out the drawing based on an open graphic language (OpenGL) graphic drawing engine. The OpenGL defines a professional graphic program interface with a programming interface specification of cross-programming language and cross-platform, and is independent of a hardware, using which the drawing of 2D or 3D graphic images may be conveniently carried out. Via the OpenGL graphic drawing engine, not only drawing of a 2D effect, e.g., a 2D poster, may be realized, but also drawing of a 3D special effect and drawing of a particle special effect and the like may be realized. However, the present application is not limited to the way of drawing based on the OpenGL graphic drawing engine, and other approaches may also be adopted, for example, drawing approaches based on a Graphic drawing engine such as Unity or OpenCL or the like are also suitable for the respective embodiments of the present application.

In an optional example, Step S104 may be executed by a processor by calling a corresponding instruction stored in a memory, or executed by a drawing module 604 operated by a processor.

It should be noted that, in each embodiment of the present application, an execution order between the operations for obtaining the business object to be displayed and for determining the background area of the video image may be any order, i.e., it may be restricted that one operation is firstly executed and the other operation is then executed, or the two operations are executed at the same time, and the implementation of the embodiments of the present application is not influenced by the execution order.

According to the method for processing the video image provided by the present embodiment, by obtaining the video image to be processed and the business object to be displayed, determining the background area of the video image to be processed, and drawing the business object in the background area of the video image by means of computer graphics, display of the business object in the background area of the video image is realized, the business object may be prevented from blocking a foreground area, normal video watching experience of an audience is not influenced, objectionable feeling of the audience is not easily to be aroused, it is beneficial for realizing an expected display effect of the business object.

Figure 2:
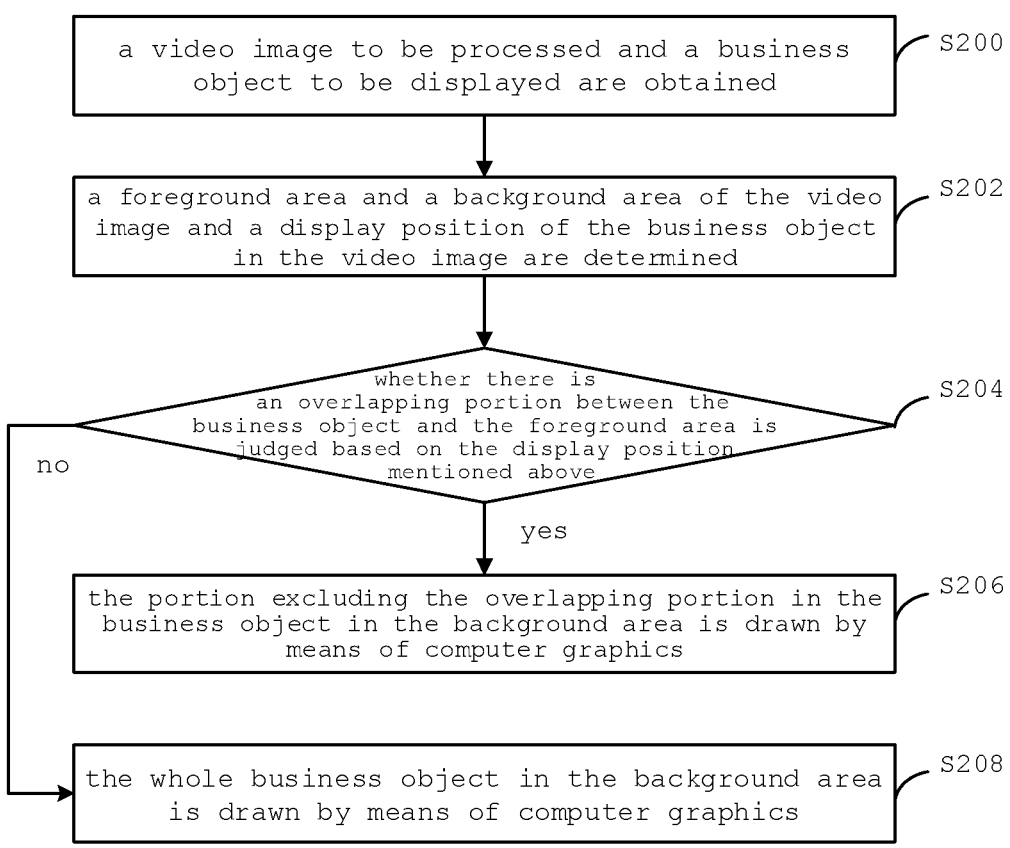
FIG. 2 is a flow diagram of another embodiment of the method for processing the video image in the present application.

FIG. 2 is a flow diagram of another embodiment of the method for processing the video image according to the embodiments of the present application. Referring to FIG. 2, the method for processing the video image in the present embodiment includes:

Step S200: a video image to be processed and a business object to be displayed are obtained.

In an optional example, Step S200 may be executed by a processor by calling a corresponding instruction stored in a memory, or executed by an obtaining module 600 operated by a processor.

Step S202: a foreground area and a background area of the video image and a display position of the business object in the video image are determined.

In an optional example of each embodiment of the present application, in the process of determining the foreground area of the video image, the foreground area and the background area of the video image may be detected from the video image; or, the foreground area of the video image may be directly detected from the video image; or, the background area of the video image may be detected from the video image, and then an area beyond the background area in the video image is determined as the foreground area of the video image. The present embodiment does not limit the technical means for determining the foreground area of the video image. Likewise, the determination of the background area of the video image may be carried out by referring to the above implementation of determining the foreground area of the video image, which will not be repeated herein.

In each embodiment of the present application, the display position may be a central position of a specified area in the video image, or may be coordinates of a plurality of edge positions in the above-mentioned specified area.

In an optional example, Step S200 may be executed by a processor by calling a corresponding instruction stored in a memory, or executed by the foreground area determining module 6042, the background area determining module 602 and a display position determining module 6040 which are operated by the processor.

Step S204: whether there is an overlapping portion between the business object and the foreground area is judged based on the display position mentioned above. If there is an overlapping portion between the business object and the foreground area, Step S206 is executed; and otherwise, Step S208 is executed.

In the present step, a purpose of judging whether there is an overlapping portion between the business object and the foreground area is to judge whether the business object blocks the foreground area of the video image. If there is an overlapping portion, it indicates that the business object blocks the foreground area of the video image; and if there is no overlapping portion, it indicates that the business object does not block the foreground area of the video image.

In an optional example, Step S204 may be executed by a processor by calling a corresponding instruction stored in a memory, or executed by a judging module 6044 operated by a processor.

Step S206: the portion excluding the overlapping portion in the business object in the background area is drawn by means of computer graphics.

In an optional way, for example, there is an overlapping portion c between the business object Y and the foreground area q of the video image S, and a part w excluding the overlapping portion c in the business object Y is drawn in the background area b of the video image S, wherein the overlapping portion c and the part w form the business object Y together, and the foreground area q and the background area b form the business object Y together.

In another optional way, if the business object covers up the foreground area of the video image, the foreground area may be displayed above the business object by adjusting a display layer of the foreground area, or the business object may be displayed below the foreground area by adjusting a display layer of the business object. The respective embodiments of the present application do not impose specific restrictions on the technical means for displaying the foreground area above the business object.

In an optional example, Step S206 may be executed by a processor by calling a corresponding instruction stored in a memory, or executed by a display module 6046 operated by a processor.

After that, follow-up processes of the present embodiment are not executed.

Step S208: the whole business object in the background area is drawn by means of computer graphics.

In an optional example, Step S208 may be executed by a processor by calling a corresponding instruction stored in a memory, or executed by the drawing module 604 operated by a processor.

According to the method for processing the video image provided by the present embodiment, the video image to be processed and the business object to be displayed are obtained, the foreground area and the background area of the video image to be processed, and the display position of the business object in the video image are determined, whether there is an overlapping portion between the business object and the foreground area of the video image is then determined based on the display position of the business object in the video image, if there is an overlapping portion, it indicates that a part of or the whole business object is positioned in the foreground area, and for the overlapping portion, the foreground area is displayed above the business object, so that the business object is prevented from blocking the foreground area, normal video watching experience of an audience is not influenced, objectionable feeling of the audience is not easily to be aroused, and it is beneficial to realize an expected display effect of the business object.

Figure 3:
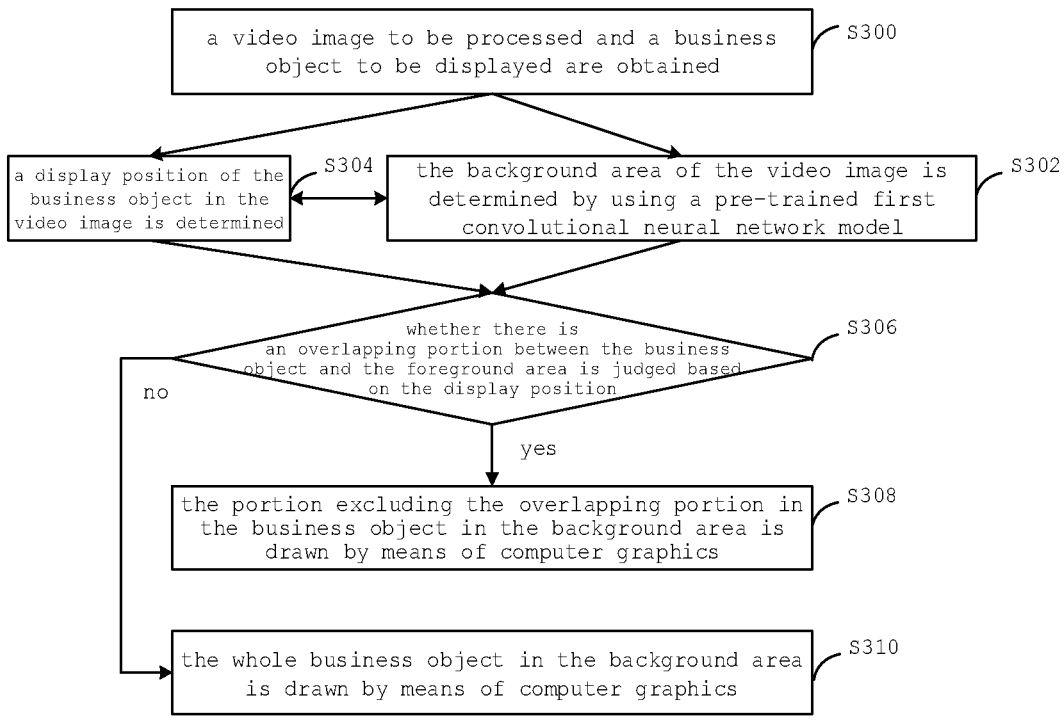
FIG. 3 is a flow diagram of another embodiment of the method for processing the video image in the present application.

FIG. 3 is a flow diagram of another embodiment of the method for processing the video image according to the embodiments of the present application. Referring to FIG. 3, the method for processing the video image in the present embodiment includes:

Step S300: a video image to be processed and a business object to be displayed are obtained.

In an optional example, Step S300 may be executed by a processor by calling a corresponding instruction stored in a memory, or executed by the obtaining module 600 operated by a processor.

Step S302: the background area of the video image is determined by using a pre-trained first convolutional neural network model.

In the present embodiment, the pre-trained first convolutional neural network model for segmenting a foreground area and a background area in a video image is configured for detecting the video image, so as to determine the background area of the video image. After the first convolutional neural network model for segmenting the foreground area and the background area in the video image is trained using a sample image tagged with a foreground area and a background area, the first convolutional neural network may be adopted to detect the video image, to obtain prediction information of the foreground area and prediction information of the background area of the video image. The background area in the video image may be determined based on the prediction information of the background area, and the foreground area and the background area in the video image may be determined accurately and efficiently.

When the first convolutional neural network model needs to be pre-trained, an optional training manner includes the following processes:

(1) A first feature vector of a first sample image is obtained using the first convolutional neural network model.

The first sample image is a sample image including tag information of the foreground area and tag information of the background area, i.e., the first sample image is a sample image with a tagged foreground area and a tagged background area. In the present embodiment, the foreground area may be an area where a main body of an image is located, for example, an area where a person is located; and the background area may be other area excluding the area where the main body is located, and it may be all or part of the other area.

In an optional implementation, the first sample image may include multiple frames of sample images of at least one video stream. In this manner, before the first feature vector of the first sample image is obtained, a video stream including multiple frames of sample images may be input into the first convolutional neural network model. During implementation, an optional manner includes: determining multiple key frames of images of the video stream as sample images firstly, and tagging foreground areas and background areas of these sample images; and on this basis, combining tagged sample images, and then inputting the video stream including multiple frames of the tagged sample image after combination into the first convolutional neural network model. Key frames are extracted from the video stream and the extracted key frames are tagged, which may be implemented by those skilled in the art by adopting any appropriate manner, for example, the key frames are extracted in a way of uniform sampling, etc. After the key frames are extracted, foreground and background of the extracted key frames may be tagged and distinguished by combining with video context, so as to obtain a relatively accurate tagging boundary. The tagged sample image is used as the first sample image, of which the first feature vector is extracted. In addition, in the present step, extraction of the first feature vector may be implemented by adopting an appropriate way in a related technology, and no more detail is provided in the present embodiment herein.

(2) Convolution processing is performed on the first feature vector using the first convolutional neural network model to obtain a convolution result of the first feature vector.

The obtained convolution result of the first feature vector includes information for distinguishing the foreground area and the background area of the video image.

A number of times the convolution processing being performed on the first feature vector may be set according to actual needs, namely in the first convolutional neural network model, a number of convolutional layers may be set according to actual needs.

The convolution result of the first feature vector is a result after feature extraction is performed on the first feature vector, and the result may effectively characterize features and classification of the foreground area and the background area in the video image.

(3) Amplification processing is performed on the convolution result of the first feature vector.

In an optional manner, the amplification of the convolution result of the first feature vector may be implemented by adopting linear interpolation, for example, including, but not limited to, linear interpolation, bilinear interpolation, trilinear interpolation, etc. A linear interpolation formula adopted may be an appropriate formula adopted by those skilled in the art according to actual needs, which is not limited by the present embodiment. Optionally, the convolution result of the first feature vector may be amplified by performing bilinear interpolation on the convolution result of the first feature vector. By performing amplification processing on the convolution result of the first feature vector, an output image with an identical size with a raw image for training may be obtained, and feature information of each pixel point is obtained, which is favorable for accurately determining the foreground area and the background area of the image. In addition, by performing amplification processing on the first feature vector after the convolution processing, the first convolutional neural network model may learn a relatively accurate amplification factor; and based on the amplification factor and the first feature factor after the amplification, it is favorable for reducing parameter adjustment and computation amount of the first convolutional neural network model, reducing training cost of the first convolutional neural network model, improving training efficiency, and shortening training time.

In one of the samples, after the convolution result of the first feature vector is obtained, bilinear interpolation is performed on the convolution result of the first feature vector via a linear interpolation layer, so as to amplify an image feature after the convolution processing, and to obtain an output of identical size with the raw image (the images have a same length and a same width). It should be noted that a specific means for implementing the bilinear interpolation is not limited in the present embodiment.

(4) Whether the amplified convolution result of the first feature vector meets a convolution convergence condition is judged.

The convolution convergence condition may be set by a person skilled in the art according to actual needs. When the amplified convolution result of the first feature vector meets the convolution convergence condition, it may be assumed that network parameters in the first convolutional neural network model are set appropriately; and when the amplified convolution result of the first feature vector cannot meet the convolution convergence condition, it may be assumed that the network parameters in the first convolutional neural network model are not set appropriately and need to be adjusted. The adjustment may be an iterative process until a result of the convolution processing on the first feature vector with the adjusted network parameters meets the convolution convergence condition.

In the present embodiment, after the convolution result of the first feature vector is amplified via a linear interpolation layer, the amplified convolution result of the first feature vector may be computed in a loss layer using a loss function, and it is determined whether the amplified convolution result meets the convolution convergence condition according to a computation result. In other words, a loss value of the amplified convolution result of the first feature vector is computed using a set loss function; and whether the amplified convolution result of the first feature vector meets the convolution convergence condition is judged according to the loss value. The loss layer and the loss function may be set appropriately by a person skilled in the art according to actual condition, such as, for example, via a cost-based function (softmax) or a logistic function. A loss value is obtained by computing the convolution result of the first feature vector and a predetermined standard output feature vector via the loss function. After the loss value is obtained, in an optional manner, whether the amplified convolution result of the first feature vector meets the convolution convergence condition is determined according to the loss value. For example, whether a result of the present training meets the convolution convergence condition is determined according to whether the loss value is smaller than or equal to a set threshold. In another optional way, whether the computation of the loss value reaches a set number of times, that is, it can be determined whether a number of times iterative training being performed on the first convolutional neural network model in this training reaches the set number of times, and if the number reaches the set number of times, the convolution convergence condition is met.

It should be noted that when multiple frames of images in the video stream are input, the loss function of the loss layer may also be configured for performing loss value computation on the multiple frames of images in the video stream respectively, and output results of the multiple frames, so as to enable the first convolutional neural network model to obtain a more stable result on a video. By parallel computation of the multiple frames of images, computational efficiency is improved.

(5) If the convolution convergence condition is met, training on the first convolutional neural network model is completed; and if the convolution convergence condition is not met, a network parameter of the first convolutional neural network model is adjusted based on the amplified convolution result of the first feature vector, and iterative training is performed on the first convolutional neural network model according to the adjusted network parameter of the first convolutional neural network model until the convolution result of the first feature vector after the iterative training meets the convolution convergence condition.

By performing the above-mentioned training on the first convolutional neural network model, the obtained first convolutional neural network model may be configured for performing feature extraction and classification on image features of the video image, thereby having a function of determining the foreground area and the background area in the video image. In practical application, the first convolutional neural network model may be configured for identifying the background area in the video image.

In order to enable the training result to be more accurate, in an optional implementation, whether the trained first convolutional neural network model is accurate may be tested by testing a sample image, and according to a test result, it is then determined to use the first convolutional neural network model or to perform retraining on the first convolutional neural network model. In this way, after preliminary training of the first convolutional neural network model is completed, test sample images may also be obtained, and the trained first convolutional neural network model may be used to predict the foreground/background area of the test sample images, wherein the test sample images may be a sample image without any tag; it is detected whether the predicted foreground/background area is correct; if the predicted foreground/background area is not correct, the first convolutional neural network model is retrained; if the predicted foreground/background area is correct, the first convolutional neural network model may be configured for determining the foreground/background of the video image, or, in order to enable the first convolutional neural network model to be more accurate, other test sample image is obtained for testing; or, a sample image different from the raw training sample image is configured for retraining.

When the background area predicted by using the first convolutional neural network model is detected to be incorrect via the test sample images, the first convolutional neural network model needs to be retrained. In a retraining manner, a sample image for retraining can use only sample image(s) of which predicted foreground/background area are predicted incorrectly obtained from the test sample image(s); and these sample images which are predicted incorrectly are then configured for performing retraining on the first convolutional neural network model. These test sample images for retraining may be subjected to foreground/background tagging before they are configured for training. By the retraining manner, the training is not only more targeted, but also favorable for saving training cost. The embodiments of the present application are not limited to this. In practical use, other sample image after foreground/background tagging may also be configured for the training.

In an optional example, Step S302 may be executed by a processor by calling a corresponding instruction stored in a memory, or executed by the background area determining module 602 operated by a processor.

Step S304: a display position of the business object in the video image is determined.

In this step, one or more display positions of the business object in the video image may be determined, and an optional implementation manner includes:

Approach One: determining a display image to be displayed from a multiple frames of display images corresponding to the business object; and determining a display position of the display image to be displayed in the video image. Approach Two: determining a display position of the business object in the video image according to a set rule.

Hereinafter, the two approaches mentioned above are illustrated respectively.

Approach One

The first frame of display images which have not been played is selected from multiple frames of display images with a playback order corresponding to the business object, and the selected display image is determined as the display image to be displayed.

Selecting the first frame of display images which have not been played is selected from multiple frames of display images with a playback order corresponding to the business object may specifically include: firstly, determining display images of which playback status are unplayed from the multiple frames of display images with a playback order corresponding to the business object, and then selecting the first frame of display images from the display images of which playback status are unplayed. In this case, after playback of the first frame of display images which have not been played is finished, playback status of the multiple frames of display images with the playback order is updated.

It should be noted that regardless of whether the business object is a dynamic business object or a static business object, the business object may be composed of multiple frames of images. Each frame of image in the video image keeps alignment with each frame of image of the business object, and when a next frame image of the video image is played, a next frame of image of the corresponding business object may also be displayed synchronously.

Approach Two

The display position of the business object in the video image is determined according to a set rule, wherein the set rule, for example, may include: a set rule 1: a preset business object is at a set display position of the video image; or a set rule 2: the display position of the business object in the video image is determined according to action detection data of a target object in the foreground area.

Based on the set rule 1, the preset business object has a corresponding relationship with its display position in the video image, and if the business object to be displayed is determined as the preset business object, the display position of the business object to be displayed is correspondingly determined as the set display position of the preset business object in the video image.

Based on the set rule 2, the display position of the business object in the video image may be determined using a pre-trained second convolutional neural network model and action detection data of the target object in the foreground area respectively; the display position of the business object in the video image may also be determined according to a type of the business object and the action detection data of the target object in the foreground area; or, the display position of the business object in the video image may be determined according to preset action data and the action detection data of the target object in the foreground area. The above-mentioned three ways of determining the display position of the business object in the video image are illustrated below.

1) The display position of the business object in the video image is determined using the pre-trained second convolutional neural network model and the action detection data of the target object in the foreground area.

A convolutional neural network model (i.e., the second convolutional neural network model) is pre-trained, and the trained second convolutional neural network model has a function of determining the display position of the business object in the video image; or, a convolutional neural network model which is trained by a third party and has a function of determining the display position of the business object in the video image may be directly used.

When the second convolutional neural network model is pre-trained, an optional training approach includes the following processes:

(1) A second feature vector of a second sample image is obtained.

The second feature vector includes position information and/or confidence information of the business object in the second sample image, as well as a target object feature vector of a target object in the second sample image. The confidence information of the business object indicates a probability of an effect (e.g., being noticed or clicked or viewed) that may be achieved when the business object is displayed at a current position, and the probability may be set according to a statistical analysis result of history data, or according to a result of a simulation experiment, or according to artificial experience. In practical application, according to actual needs, only the position information of the business object is trained, or only the confidence information of the business object is trained, or both the position information and the confidence information are trained. By training the position information and the confidence information, the trained second convolutional neural network model is enabled to determine the position information and the confidence information of the business object more effectively and accurately, so as to provide a basis for processing the video image.

The second convolutional neural network model trains a large amount of second sample images. In the present embodiment, a second sample image containing the business object may be configured for training the second convolutional neural network model. Those skilled in the art should understand that, in addition to the business object, the second sample images for training may also contain information of the target object attribute, i.e., a facial expression and/or movement of a human face, a gesture and/or movement of a human hand, etc. In addition, the business objects in the second sample images in the present embodiment may be pre-tagged with position information or confidence information, or with both the position information and the confidence information. Certainly, in practical application, the information may also be obtained by other means. However, by tagging the business object with corresponding information in advance, data and a number of times of interaction for data processing may be effectively saved, and data processing efficiency may be improved.

The second sample images with the position information and/or the confidence information of the business object, as well as a certain target object attribute are used as training samples, and feature vector extraction is performed on the training sample to obtain a business object feature vector containing the position information and/or the confidence information of the business object, and to obtain a target object feature vector corresponding to the target object attribute.

Optionally, the second convolutional neural network model may be configured for training the business object and the target object simultaneously, and in this case, the second feature vector of the second sample image also includes a feature of the target object.

The extraction of the second feature vector may be implemented adopting an appropriate way in a related art, and no more detail is provided in the present embodiment.

(2) Convolution processing on the second feature vector is performed to obtain a convolution result of the second feature vector.

In the present embodiment, the obtained convolution result of the second feature vector contains the position information and/or the confidence information of the business object, as well as a feature vector convolution result corresponding to a target object feature vector corresponding to the target object attribute. In the case of joint training of the target object and the business object, the feature vector convolution result also contains target object information.

A number of times the convolution processing is performed on the second feature vector may be set according to actual needs, namely in the second convolutional neural network model, a number of convolutional layers is set according to actual needs, and no more detail is provided herein.

The convolution result of the second feature vector is a result after feature extraction on the second feature vector, and the result may effectively characterize the business object corresponding to feature of the target object in the video image.

In the present embodiment, when the second feature vector contains not only the position information of the business object, but also the confidence information of the business object, namely under the condition that both the position information and the confidence information of the business object are trained, the convolution result of the second feature vector is shared when convergence condition judgment is carried out subsequently without repeated processing and computation, so that resource loss caused by data processing may be reduced, and a data processing rate and data processing efficiency are improved.

(3) Whether the position information and/or confidence information of the corresponding business object in the convolution result of the second feature vector meets a business object convergence condition is judged, and whether the corresponding feature vector of the target object in the convolution result of the second feature vector meets a target object convergence condition is judged.

The business object convergence condition and the target object convergence condition may be appropriately set by a person skilled in the art according to actual needs. When the position information and/or the confidence information meets the business object convergence condition and the feature vector of the target object meets the target object convergence condition, it may be assumed that network parameters in the second convolutional neural network model are set appropriately; and when the position information and/or the confidence information do not meet the business object convergence condition and/or the feature vector of the target object does not meet the target object convergence condition, it may be assumed that the network parameters in the second convolutional neural network model are not set appropriately and need to be adjusted, and the adjustment process may be an iterative process until a result of the convolution processing on the second feature vector with the adjusted network parameters meets the convergence condition.

In an optional way, the business object convergence condition may be set according to a preset standard position and/or a preset standard confidence, for example, a distance between a position indicated by the position information of the business object in the convolution result of the second feature vector and a preset standard position satisfying a certain threshold is used as the convergence condition of the position information of the business object; and a difference between a confidence indicated by the confidence information of the business object in the convolution result of the second feature vector and a preset standard confidence satisfying a certain threshold is used as the convergence condition of the confidence information of the business object, etc.

Optionally, the preset standard position may be an average position obtained after average processing is performed on positions of the business objects in the second sample images to be trained; and the preset standard confidence may be an average confidence obtained after average processing is performed on the confidences of the business objects in the second sample images to be trained. Because the second sample images are samples to be trained and have a huge data volume, the standard position and/or the standard confidence may be set according to the positions and/or the confidences of the business objects in the second sample images to be trained, and the standard position and standard confidence set in this way are more objective and accurate.

In the process of judging whether position information and/or confidence information of a corresponding business object in the convolution result of the second feature vector meets the business object convergence condition, an optional way includes:

obtaining position information of the corresponding business object in the convolution result of the second feature vector, computing a Euclidean distance between the position indicated by the position information of the corresponding business object and the preset standard position to obtain a first distance between the position indicated by the position information of the corresponding business object and the preset standard position, and judging whether the position information of the corresponding business object meets the business object convergence condition according to the first distance;

and/or obtaining the confidence information of the corresponding business object in the convolution result of the second feature vector, computing a Euclidean distance between the confidence indicated by the confidence information of the corresponding business object and the preset standard confidence to obtain a second distance between the confidence indicated by the confidence information of the corresponding business object and the preset standard confidence, and judging whether the confidence information of the corresponding business object meets the business object convergence condition according to the second distance. By adopting a way of Euclidean distance, the implementation is simple and whether the convergence condition is met may be effectively indicated. However, the embodiments of the present application are not limited to this, and other ways such as Mahalanobis distance, Bhattacharyya distance etc., may also be adopted.

Optionally, as mentioned above, the preset standard position is an average position obtained after average processing is performed on the positions of the business objects in the second sample images to be trained; and/or the preset standard confidence is an average confidence obtained after average processing is performed on the confidences of the business objects in the second sample images to be trained.

When the convolution result of the second feature vector further contains information of the target object, whether the information of the target object is converged may be judged with reference to related convergence condition using the second convolutional neural network model, and no more detail will be provided herein. If the information of the target object meets the convergence condition, namely the feature vector of the target object in the convolution result of the second feature vector meets the target object convergence condition, the target object may be classified to identify a category of the target object, so as to provide a reference and a basis for the subsequent determination of the display position of the business object.

(4) If the convergence conditions mentioned above are all met, namely the position information and/or the confidence information meets the business object convergence condition, and the feature vector of the target object meets the target object convergence condition, the training of the second convolutional neural network model is completed; and if any one or all of the convergence conditions above are not met, namely the position information and/or the confidence information do not meet the business object convergence condition, and/or the feature vector of the target object does not meet the target object convergence condition, a parameter of the second convolutional neural network model is adjusted according to the position information and/or the confidence information of the corresponding business object in the convolution result of the second feature vector as well as to the feature vector of the target object in the convolution result of the second feature vector, and iterative training is performed on the second convolutional neural network model according to the adjusted network parameter of the second convolutional neural network model until the position information and/or the confidence information of the business object after the iterative training meets the convergence condition and the feature vector of the target object meets the target object convergence condition.

By performing the above-mentioned training on the second convolutional neural network model, the second convolutional neural network model may be configured for performing feature extraction and classification on the display position based on the business object, thereby having a function of determining the display position of the business object in the video image. When a plurality of the display positions are provided, by the above-mentioned training performed on the confidence of the business object, the second convolutional neural network model may further determine a preference order of display effects of the display positions, thereby determining a final display position. In a subsequent application, when the business object needs to be displayed, a valid display position may be determined according to the video image.

In addition, before the above-mentioned training is performed on the second convolutional neural network model, the second sample images may be pre-processed in advance, including: obtaining a plurality of second sample images, wherein each second sample image contains tag information of the business object; determining a position of the business object according to the tag information, and judging whether the distance between the determined position of the business object and a preset position is smaller than or equal to a set threshold; and determining a second sample image corresponding to a business object with a distance smaller than or equal to the set threshold as a second sample image to be trained. Both of the preset position and the set threshold may be appropriately set by those skilled in the art in any appropriate way, such as, for example, according to a data statistical analysis result or a related distance computational formula or artificial experience, which is not limited by the present embodiment.

In an optional way, the position of the business object determined according to the tag information may be a central position of the business object. When determining the position of the business object according to the tag information and judging whether the distance between the determined position of the business object and the preset position is smaller than or equal to the preset threshold, the central position of the business object may be determined according to the tag information, and whether a variance between the central position and the preset position is smaller than or equal to the set threshold is further judged.

By pre-processing the second sample images in advance, sample images that do not meet conditions may be filtered out, so as to ensure accuracy of a training result.

The training of the second convolutional neural network model is implemented through the above process, and the trained second convolutional neural network model may be configured for determining the display position of the business object in the video image. For example, in alive video process, when a host clicks a business object to instruct to display the business object, after the second convolutional neural network model obtains facial feature points of the host in a live video image, a final position for displaying the business object, such as, for example, a position with a preset distance from a head of the host in the background area, may be indicated, and a live application is further controlled to display the business object at the position; or, in a broadcast process of the video, when the host clicks the business object to instruct to display the business object, the second convolutional neural network model may directly determine the display position of the business object according to the video image being broadcasted.

2) The display position of the business object in the video image is determined according to the type of the business object and the action detection data of the target object in the foreground area.

Firstly, a plurality of display positions of the business object in the video image are obtained according to the action detection data of the target object in the foreground area and the type of the business object; and then, at least one display position is selected from the plurality of display positions as the final display position of the business object in the video image. An action type of the target object includes for example, but not limited to, a human face type, a hand type and an action type. The human face type is used to indicate that a human face occupies primary part in the video image; the hand type is used to indicate that a hand occupies main part in the video image; and the action type is used to indicate that a person does some kind of action. The action detection data of the target object may include for example, but not limited to, any one or more of blink data, mouth opening data, head nodding data, head waving data, kissing data, smiling data, hand waving data, scissor hand data, fisting data, hand-on-chin data, thumb data, pistol posture data, OK hand data, etc., and an action corresponding to a target corresponding to the above-mentioned action detection data includes but not limited to any one or more of blinking, opening a mouth, nodding a head, kissing, smiling, waving a hand, making a scissor hand, fisting, putting a hand on a chin, showing a thumb, making a pistol posture, showing an OK hand, etc.

3) The display position of the business object in the video image is determined according to preset action data and action detection data of the target object in the foreground area.

It is determined whether the action detection data of the target object in the foreground area matches the preset action data, that is, it is judged whether an action of the target object in the foreground area match a preset action; and if the action detection data of the target object in the foreground area matches the preset action data, a target display position corresponding to the preset action data is obtained from a corresponding relationship between pre-stored action data and display position and is determined as the display position of the business object in the video image.

In implementation, a variety of different action data may be preset, and different action data is correspondingly tagged, such as, for example, tagged as a face action or hand action. Different action data correspond to different display positions. The action detection data of the target object in the foreground area is matched with the preset action data, and if the action detection data is identical with the preset action data, namely the action of the target object in the foreground area is identical with preset action, it may be determined that the action detection data of the target object in the foreground area is matched with the preset action data.

In order to improve an accuracy of matching, the above-mentioned matching result may be determined in a way of computation, for example, a matching degree between the action detection data and the preset action data may be computed by setting a matching algorithm, for example, the action detection data and the preset action data may be configured for performing matching computation to obtain a matching degree value between them. A matching degree value between the action detection data and each preset action data is computed respectively through the above-mentioned way, and a maximum matching degree value is selected from the obtained matching degree values. If the maximum matching degree value exceeds a preset matching threshold, it may be determined that the preset action data corresponding to the maximum matching degree value is matched with the action detection data. If the maximum matching degree value does not exceed the preset matching threshold, the matching is failed.

It should be noted that the above-mentioned Step S302 and Step S304 may be executed at the same time, or executed according to any sequence. For example, Step S302 is executed first and Step S304 is then executed, or Step S304 is executed first and Step S302 is then executed. An execution sequence of Step S302 and Step S304 is not specifically defined in the present embodiment.

In an optional example, Step S304 may be executed by a processor by calling a corresponding instruction stored in a memory, or executed by the display position determining module 6040 operated by a processor.

Step S306: whether there is an overlapping portion between the business object and the foreground area is judged based on the display position. If there is an overlapping portion between the business object and the foreground area, Step S306 is executed; and otherwise, Step S310 is executed.

In the present step, a purpose of judging whether there is an overlapping portion between the business object and the foreground area is to judge whether the business object blocks the foreground area of the video image. If there is an overlapping portion, it indicates that the business object blocks the foreground area of the video image; and if there is no overlapping portion, it indicates that the business object does not block the foreground area of the video image.

In an optional example, Step S306 may be executed by a processor by calling a corresponding instruction stored in a memory, or executed by a judging module 6044 operated by a processor.

Step S308: the portion excluding the overlapping portion in the business object in the background area is drawn by means of computer graphics.

In an optional way, for example, there is an overlapping portion c between the business object Y and the foreground area q of the video image S, and a part w excluding the overlapping portion c in the business object Y is drawn in the background area b of the video image S, wherein the overlapping portion c and the part w form the business object Y together, and the foreground area q and the background area b form the business object Y together.

In another optional way, if the business object blocks the foreground area of the video image, the foreground area may be displayed above the business object by adjusting a display layer of the foreground area, or the business object may be displayed below the foreground area by adjusting a display layer of the business object. The present embodiment does not impose specific restriction on the technical means for displaying the foreground area above the business object.

In the present embodiment, when the foreground area is displayed above the business object, the foreground area corresponding to the overlapping portion may be displayed above the business object corresponding to the overlapping portion.

In an optional example, Step S308 may be executed by a processor by calling a corresponding instruction stored in a memory, or executed by the display module 6046 operated by a processor.

After that, follow-up process of the present embodiment is not executed.

Step S310: the whole business object in the background area is drawn by means of computer graphics.

In an optional example, Step S310 may be executed by a processor by calling a corresponding instruction stored in a memory, or executed by the drawing module 604 operated by a processor.

According to the method for processing the video image provided by the present embodiment, the video image to be processed and the business object to be displayed are obtained, the foreground area and the background area of the video image to be processed, and the display position of the business object in the video image are determined, whether there is an overlapping portion between the business object and the foreground area of the video image is then determined based on the display position of the business object in the video image, if there is an overlapping portion, it indicates that a part of or the whole business object is positioned in the foreground area, and for the overlapping portion, the foreground area is displayed above the business object, so that the business object is prevented from blocking the foreground area, normal video watching experience of an audience is not influenced, objectionable feeling of the audience is not easily aroused, it is beneficial for realizing an expected display effect of the business object.

In an optional example of each embodiment of the present application, the trained first convolutional neural network model may be used to detect an image and to segment out the foreground/background of the image. An optional implementation includes:

obtaining a video image to be detected, wherein the image may include a static image or an image in a video; and detecting the video image with the trained first convolutional neural network model, to obtain prediction information of the foreground area and prediction information of the background area of the video image.

In an optional solution, the above-mentioned video image is an image in alive video. In another optional solution, the above-mentioned video image includes multiple frames of images in a video stream. Because the multiple frames of images in the video stream has substantial context linkages, the foreground/background of each frame of image in the video stream may be detected quickly and efficiently through the trained first convolutional neural network model.

Figure 4:
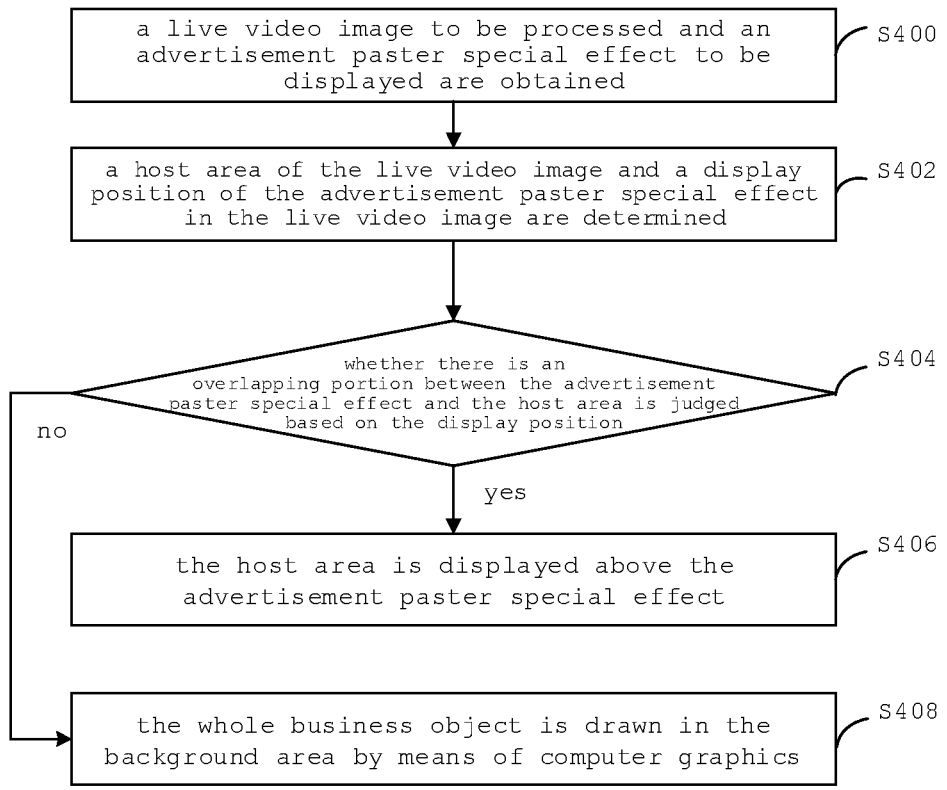
FIG. 4 is a flow diagram of another embodiment of the method for processing the video image in the present application.

FIG. 4 is a flow diagram of another embodiment of the method for processing the video image in the present application. In each embodiment of the present application, the business object may be a target specific effect containing semantic information, wherein the target specific effect may include at least one of the following forms of special effects containing advertisement information: a two-dimensional paster effect, a three-dimensional effect, and a particle effect. The present embodiment describes a processing solution of the video image of the embodiments of the present application by taking that the business object is a two-dimensional advertisement paster effect and the video image is a live video image as an example. Referring to FIG. 4.

The method for processing the video image in the present embodiment includes:

Step S400: a live video image to be processed and an advertisement paster special effect to be displayed are obtained.

The live video image to be processed may be obtained from a live video application. The advertisement paster special effect to be displayed may be an advertisement paster special effect customized by an advertiser, or be an advertisement paster special effect selected by a host.

In an optional example, Step S400 may be executed by a processor by calling a corresponding instruction stored in a memory, or executed by the obtaining module 600 operated by a processor.

Step S402: a host area of the live video image and a display position of the advertisement paster special effect in the live video image are determined.

The live video image may be partitioned into two areas, namely a host area and a background area respectively. The host area is an area for broadcasting, and the background area is an area in the live video image excluding the host area.

The executing process for determining the host area and the display position in this step may be implemented according to related contents in the above-mentioned embodiment, and no detail is repeated here.

In an optional example, Step S402 may be executed by a processor by calling a corresponding instruction stored in a memory, or executed by the display position determining module 6040 operated by a processor.

Step S404: whether there is an overlapping portion between the advertisement paster special effect and the host area is judged based on the display position. If there is an overlapping portion between the advertisement paster special effect and the host area, Step S406 is executed; and otherwise, Step S408 is executed.

In an optional example, Step S402 may be executed by a processor by calling a corresponding instruction stored in a memory, or executed by a judging module 6044 operated by a processor.

Step S406: the host area is displayed above the advertisement paster special effect.

In an optional example, Step S406 may be executed by a processor by calling a corresponding instruction stored in a memory, or executed by a display module 6046 operated by a processor.

After that, follow-up process of the present embodiment is not executed.

Step S408: the whole business object is drawn in the background area by means of computer graphics.

In an optional example, Step S406 may be executed by a processor by calling a corresponding instruction stored in a memory, or executed by the drawing module 604 operated by a processor.

In the present embodiment, when the main body of the video image is a host, an area of primary interest of an audience is a face area and body movement of the host. In order to enable content of the advertisement paster special effect to be noticed by an audience without affecting the host, a semantic virtual item such as the advertisement paster special effect for example may be added to a video image related area by enhancing an effect of reality. Commercial value is achieved through a display effect and information on the virtual item. In this way, main image and action of the host are remained, and interest of the video image is increased by a special effect of augmented reality, thereby reducing possible objectionable feeling of the audience due to advertisement putting, attracting attention of the audience, and capable of forming commercial value. For example, if the advertisement paster special effect is an aerial bird paster special effect and the aerial bird paster special effect is displayed in the video image, when there is an overlapping portion between the display position of the aerial bird paster special effect and the host area, namely the aerial bird paster special effect blocks the host area, the host area is displayed above the aerial bird paster special effect. Specifically, if the overlapping portion between the aerial bird paster special effect and the host area is head portion of the aerial bird paster special effect, and rest portion of the aerial bird paster special effect does not overlap with the host area, the host area is displayed above the head portion of the aerial bird paster special effect, and display effect is that the portion excluding the head portion of the aerial bird paster special effect and the host area are visible. If the overlapping portion between the aerial bird paster special effect and the host area is the whole aerial bird paster special effect, the host area is displayed above the whole aerial bird paster special effect, and display effect is that the whole aerial bird paster special effect is invisible and the host area is visible.

It should be noted that, by taking the aerial bird paster special effect as an example, the above advertisement paster special effect may be a static advertisement paster special effect, or a dynamic advertisement paster special effect. When the advertisement paster special effect is the dynamic advertisement paster special effect, each frame of the dynamic advertisement paster special effect may be processed as a static advertisement paster special effect, and the processing process may refer to relevant content in the above-mentioned embodiment and will not be repeated herein.

With the rising of Internet live broadcast, more and more videos appear in a form of live broadcast. This kind of video has characteristics of simple scenario, real-time, and small video stream size because the audience mainly watches the video on a mobile terminal such as a mobile phone, etc. According to the present embodiment, an advertisement is put through an business object, advertisement putting and broadcasting content of a video live are effectively integrated, which is flexible and has a vivid effect, live watching experience of a user is not influenced, and putting effect of the advertisement is promoted favorably. This is especially suitable for scenarios of business object display with a small display screen, advertisement putting, etc.

Besides, the method for processing the video image in the present embodiment may be implemented on any proper electronic device with functions of data acquisition, processing and transmission, and the embodiment of the present application does not restrict an implementation device.

In addition, in another embodiment of the method for processing the video image of the present application, the business object to be displayed is configured for drawing the background area of the video image in a subsequent drawing step, so as to enable the business object to cover raw content in the background area of the video image. The business object to be displayed may include various forms, and each embodiment of the present application does not restrict a specific form of the business object to be displayed. For example, the business object to be displayed may be a picture A containing a sandbeach scenario, and the raw content in the background area of the video image is a picture B containing an indoor scenario. In the present embodiment, the business object is drawn in the background area of the video image by computer graphics, and the business object may be drawn in the background area by computer graphics so as to enable the business object to cover the raw content of the background area.

After the background area is determined, the business object may be drawn in the background area of the video image by computer graphics, namely the business object is drawn in the whole background area of the video image by computer graphics. It is realized that the raw content of the background area is replaced by the business object drawn in the background area. For example, the raw background area of the video image is one indoor scenario picture, the business object is one waterfall picture, the waterfall picture rather than the raw indoor scenario picture is displayed in the background area after drawing the business object, and the foreground area of the video image may be kept unchanged.

By the method for processing the video image in the present embodiment, the business object is drawn in the determined background area by means of computer graphics to enable the business object to cover the raw content of the background in the video image, thereby effectively realizing an expected putting effect of the business object.

In the method for processing the video image in each embodiment of the present application, after the business object is drawn in the background area of the video image by computer graphics, besides that the video image with the business object drawn in the background area may be displayed locally, the video image with the business object drawn in the background area may also be sent to other device, such as, for example, a mobile terminal, a PC, a server, or a tablet computer, thereby realizing sharing of the video image with the business object drawn in the background area.

Figure 5:
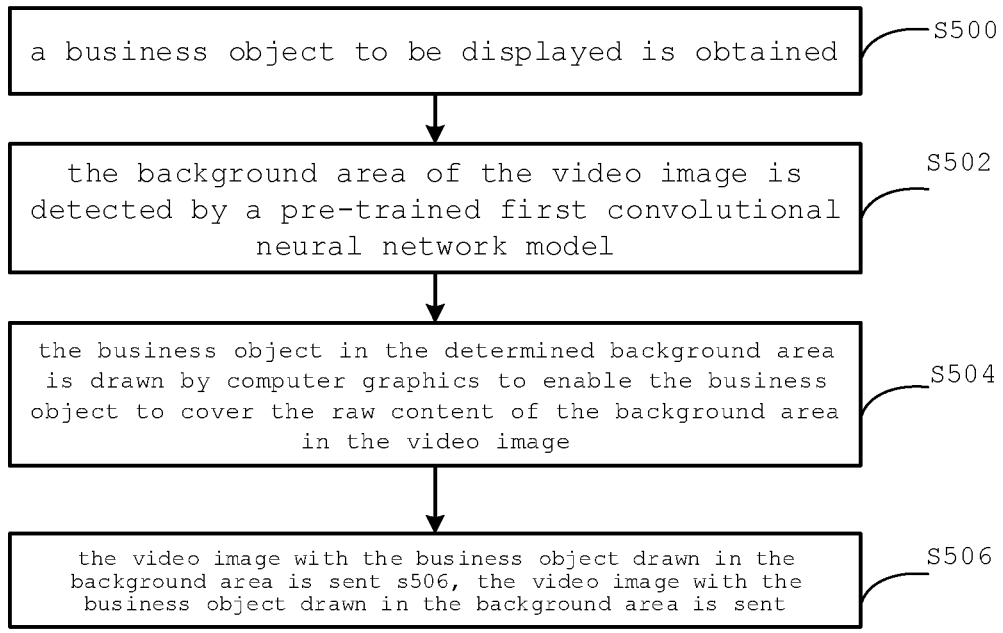
FIG. 5 is a flow diagram of another embodiment of the method for processing the video image in the present application.

FIG. 5 is a flow diagram of another embodiment of the method for processing the video image in the present application. The present embodiment focuses on difference with the above-mentioned embodiments, similarities of which may refer to introduction and explanation in the above embodiments, and no more detail is provided herein. Referring to FIG. 5, the method for processing the video image in the present embodiment includes:

Step S500: a business object to be displayed is obtained.

In each embodiment of the present application, the business object to be displayed may be obtained via, but not limited to, the following ways: obtaining the business object from a predetermined storage position, or receiving the business object from a video source. For example, the business object is stored locally in a mobile terminal, and the business object may be read directly from the mobile terminal locally, where a locally stored business object may be any one or more of the target video, the target image and the target specific effect introduced above; when the business object is the target video, the target video may be received from the video source; and if the target video is a live video, the live video may be received from a live broadcast camera.

In an optional example, Step S500 may be executed by a processor by calling a corresponding instruction stored in a memory, or executed by the obtaining module 600 operated by a processor.

Step S502: the background area of the video image is detected by a pre-trained first convolutional neural network model.

In the present embodiment, the first convolutional neural network model, which is trained and configured for segmenting the foreground area and the background area in the video image, is configured for detecting the video image to determine the background area of the video image. After being trained through sample images tagged with foreground areas and background areas, the first convolutional neural network model may accurately and efficiently determine the foreground area and the background area in the video image.

In an optional way of each embodiment of the present application, the first convolutional network model is a full convolutional network model, and compared with a convolutional network model with a fully connected layer, fewer convolutional layer parameters are required by the full convolutional network model, which makes the training speed to be faster.

In one of optional examples, a brief description of an exemplary structure of the first convolutional neural network model is as follows:

(1) Input Layer

For example, a feature vector of a sample image to be trained may be input, and the feature vector contains information of a background area of the sample image, or the feature vector contains information of a foreground area and information of a background area of the sample image.

(2) Convolutional Layer

// In a first stage, convolution processing is performed on the feature vector of the sample image to be trained, so as to obtain a convolution result.

2.<=1 convolutional layer 1_1 (3×3×64)
3.<=2 nonlinear response ReLU layer
4.<=3 convolutional layer 1_2 (3×3×64)
5.<=4 nonlinear response ReLU layer
6.<=5 pooling layer (3×3/2)
7.<=6 convolutional layer 2_1 (3×3×128)
8.<=7 nonlinear response ReLU layer
9.<=8 convolutional layer 2_2 (3×3×128)
10.<=9 nonlinear response ReLU layer
11.<=10 pooling layer (3×3/2)
12.<=11 convolutional layer 3_1 (3×3×256)
13.<=12 nonlinear response ReLU layer
14.<=13 convolutional layer 3_2 (3×3×256)
15.<=14 nonlinear response ReLU layer
16.<=15 convolutional layer 3_3 (3×3×256)
17.<=16 nonlinear response ReLU layer
18.<=17 pooling layer (3×3/2)
19.<=18 convolutional layer 4_1 (3×3×512)
50.<=19 nonlinear response ReLU layer
21.<=50 convolutional layer 4_2 (3×3×512)
22.<=21 nonlinear response ReLU layer
23.<=22 convolutional layer 4_3 (3×3×512)
24.<=23 nonlinear response ReLU layer
25.<=24 pooling layer (3×3/2)
26.<=25 convolutional layer 5_1 (3×3×512)
27.<=26 nonlinear response ReLU layer
28.<=27 convolutional layer 5_2 (3×3×512)
29.<=28 nonlinear response ReLU layer
30.<=29 convolutional layer 5_3 (3×3×512)
31.<=30 nonlinear response ReLU layer // In a second stage, interpolation amplification is performed on the convolution result obtained in the first stage, and computation of a loss function is performed.

32.<=31 linear interpolation layer
33.<=32 loss layer, for performing computation of a loss function (3) Output Layer First, after the feature vector is obtained through the processing in the previous 31 layers, the linear interpolation layer performs interpolation on the feature vector after the processing in the previous 31 layers via a bilinear interpolation method, so as to amplify a middle layer feature and obtain an output image with a size same as the sample image for training (lengths of the images and widths of the images are identical).

Second, in the present embodiment, the loss layer in the layer 33 is processed by using a Softmax function. An optional Softmax function is as follows:

$$P(y=j|x) = \frac{e^{x^T w_j}}{\sum_{K=1}^{K} e^{x^T w_j}}$$

where x represents an input feature, j represents a jth class, y represents an output class, K represents a total number of classes, k represents a kth class, Wj represents a classification parameter of the jth class, XT represents transposition of an X vector, and P(y=j|x) represents a probability that a given input x is predicted to be of the jth class.

However, the present embodiment is not limited to this, and those skilled in the art may also adopt other Softmax function in actual use, which is not restricted by the embodiment of the present invention.

Third, the processing of the feature vector by the above-mentioned convolutional layer may be carried out by being iterated for a plurality of times, and every time the iteration is completed, parameter(s) of the first convolutional neural network model (such as a value of a convolution kernel, a weight of linear variation of interlayer outputs, etc.) are adjusted according to a result computed by a loss layer; and the processing is performed again based on the first convolutional neural network model with adjusted parameters, and the iteration is carried out for a plurality of times until a convergence condition is met.

Fourth, in the present embodiment, the convergence condition may be that a number of times of iterative training performed on the first convolutional neural network model reaches a maximum number of times of iteration, such as 10000-50000 times for example.

Fifth, for the above-mentioned learning of first convolutional neural network model on the video images, a single frame of video image may be input, or multiple frames of video images may be input, and a result of the multiple frames of video images is output. Namely, the first input layer may input one frame video image or one video stream, and the video stream contains multiple frames of video images.

The last loss layer may compute a loss function for one frame of video image, or compute a loss function for multiple frames of video images of the video stream.

By training and learning in a manner of video stream, the first convolutional neural network model is enabled to obtain a relatively stable result for a video, and meanwhile, computational efficiency is improved by parallel computation of the multiple frames of video images.

Simultaneous input and output of the multiple frames of video images may be realized by modifying sizes of feature spectra of an input layer and an output layer.

Sixth, in the above description of the convolutional network structure, 2.<=1 represents that the current layer is the second layer, and an input is the first layer; convolutional layer parameters (3×3×64) in the brackets after the convolutional layer indicate that a size of the convolution kernel is 3×3 and a number of channels is 64; and (3×3/2) in the brackets after the pooling layer indicates that a size of a pooling kernel is 3×3 and an interval is 2. The rest may be deduced analogously and is not described without more details.

In a structure of the first convolutional neural network model mentioned above, there is one nonlinear response unit behind each convolutional layer, and the nonlinear response unit adopts a rectified linear unit (ReLU). By adding the above-mentioned rectified linear unit behind the convolutional layer, a mapping result of the convolutional layer is sparse as much as possible, so as to be closer to a human visual response, thereby enabling image processing effect to be better.

The convolution kernel of the convolutional layer is set to be 3×3, so that local information may be integrated relatively well.

A stride (stride) of the pooling layer (Max pooling) is set to enable a feature of an upper layer to obtain a bigger vision without increasing the amount of computation; and the stride of the pooling layer further has a feature of enhancing spatial invariance, namely an identical input is allowed to appear at different image positions with identical output result response.

The linear interpolation layer may amplify the previous feature to a size of a raw image to obtain a predicted value of each pixel.

To sum up, the convolutional layer of the full convolutional neural network model may be configured for information summarization and fusion, the max pooling layer (Max pooling) performs summarization of high layer information, and fine adjustment may be performed to a structure of the first convolutional neural network model to adapt to balances between different performances and efficiencies.

However, those skilled in the art should understand that the size of the above-mentioned convolution kernel, the number of the channels, the size of the pooling kernel, the interval and the number of the convolutional layers are all exemplarily illustrated; and in practical application, those skilled in the art may perform appropriate adjustments according to actual needs, which is not restricted by the embodiments of the present disclosure. In addition, the combination of all layers and parameters in the first convolutional neural network model in the present embodiment are optional and may be combined in any way.

By the first convolutional neural network model in the present embodiment, foreground-background area in the video image may be effectively segmented.

In an optional example, Step S502 may be executed by a processor by calling a corresponding instruction stored in a memory, or executed by the background area determining module 602 operated by a processor.

Step S504, the business object in the determined background area is drawn by computer graphics to enable the business object to cover the raw content of the background area in the video image.

In an optional example, Step S504 may be executed by a processor by calling a corresponding instruction stored in a memory, or executed by the drawing module 604 operated by a processor.

Step S506, the video image with the business object drawn in the background area is sent.

In an optional example, Step S506 may be executed by a processor by calling a corresponding instruction stored in a memory, or executed by a communication module on an electronic device.

For example, the above-mentioned steps S500-S504 may be executed on a mobile terminal A, the video image with the business object drawn in the background area may be displayed on the mobile terminal A, and/or the video image with the business object drawn in the background area is sent to a mobile terminal B, a mobile terminal C, a server D, etc.

Besides that the above-mentioned device for implementing the method in the embodiments of the present application sends the video image with the business object drawn in the background area to other device, the business object may also be drawn directly on other device. First, the business object to be displayed may be obtained, where the business object per se may be obtained, and attribute information of the business object may also be obtained. The business object per se is obtained from a storage library of business objects according to the attribute information of the business object. Then, the business object is drawn in the background area of the video image. The attribute information of the business object may be originated from a transmission stream including the video image and attribute information of the business object. The attribute information of the business object may be configured for tagging the business object per se, and the attribute information of one business object corresponds to only one business object per se or to only one kind of the business object per se. For example, the attribute information of the business object may be a serial number with a unique identity.

It should be noted that the storage library of business objects may include a storage library of the business object of a current device for implementing the method in the embodiments of the present application and a storage library of a business object of other device. In addition, the business object itself and the attribute information of the business object in the storage library of the business object of the current device and those in the storage libraries of the business objects of the other devices may be kept synchronous.

The above-mentioned embodiment shown in FIG. 5 may be applied to an exemplary application scenario, for example, a video image of a host during live broadcast is obtained by a host terminal, wherein the video image is a live video image. The background area is detected from the video image, the business object is obtained locally from the host terminal or the business object is received from a third party camera in real time, the business object is drawn in the background area of the video image by means of computer graphics, the video image after the business object is drawn is displayed on the host terminal, and the video image after the business object is drawn is sent to a server or a fans terminal, and is transited or stored in the server, and is displayed on the fans terminal. The background area of the live video image includes an area excluding the host image in the live video image.

It should be noted that the execution sequence between Step S500 and Step S502 mentioned above may be as follows: Step S500 is executed first and Step S502 is then executed; Step S502 is executed first and Step S500 is then executed; or Step S500 and Step S502 are executed at the same time. The present embodiment does not restrict the execution sequence between Step S500 and Step S502, and takes executing Step S500 first and Step S502 then only as an example for description.

By the method for processing the video image provided by the present embodiment, the business object may be drawn in the determined background area by means of computer graphics to enable the business object to cover the raw content of the background area in the video image and to enable the business object to be combined with video playback, so that network resources and/or system resources of a client are favorably saved, type of the background area is enriched, and an expected putting effect of the business object may be effectively achieved, In addition, if a received target video is drawn in the background area of the video image, an effect of watching videos in the background area of the video image is achieved. If the content of the business object is related to the content of the video image, for example, the business object is a target video, the target video is a video for introducing the Statue of Liberty, and the host is introducing the Statue of Liberty in the video image, the background area after the business object is drawn may be regarded as auxiliary display of the video image, thereby promoting display effect of the video image.

Figure 6:
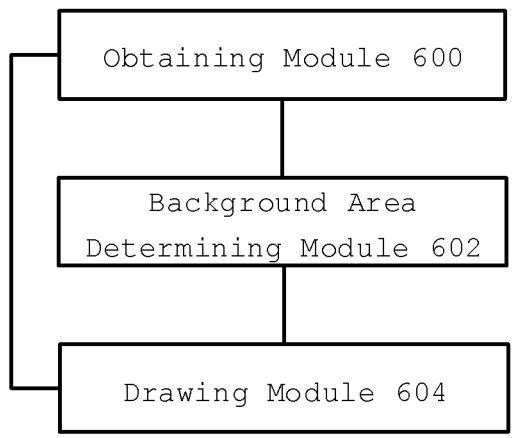
FIG. 6 is a structure block diagram of one embodiment of the apparatus for processing the video image in the present application.

FIG. 6 is a structure block diagram of one embodiment of the apparatus for processing the video image in the present application. The apparatus for processing the video image in each embodiment of the present application may be configured for implementing each embodiment of the method for processing the video image as mentioned above. Referring to FIG. 6, the apparatus for processing the video image in the present embodiment includes: an obtaining module 600 for obtaining the video image to be processed and the business object to be displayed; a background area determining module 602 for determining the background area of the video image; and a drawing module 604 for drawing the business object in the background area of the video image by means of computer graphics.

By the apparatus for processing the video image provided by the present embodiment, the video image to be processed and the business object to be displayed are obtained, the background area of the video image to be processed is determined, and the business object is drawn in the background area of the video image by means of computer graphics, thereby realizing display of the business object in the background area of the video image, preventing the business object from blocking the foreground area without affecting normal video viewing experience of an audience. Objectionable feeling of the audience is not easily to be aroused, and it is beneficial for realizing an expected display effect of the business object.

In an optional example of each embodiment of the present application, the drawing module 604 is configured for drawing the business object to be displayed in the background area of the video image by computer graphics to enable the business object to cover the raw content of the background area.

Figure 7:
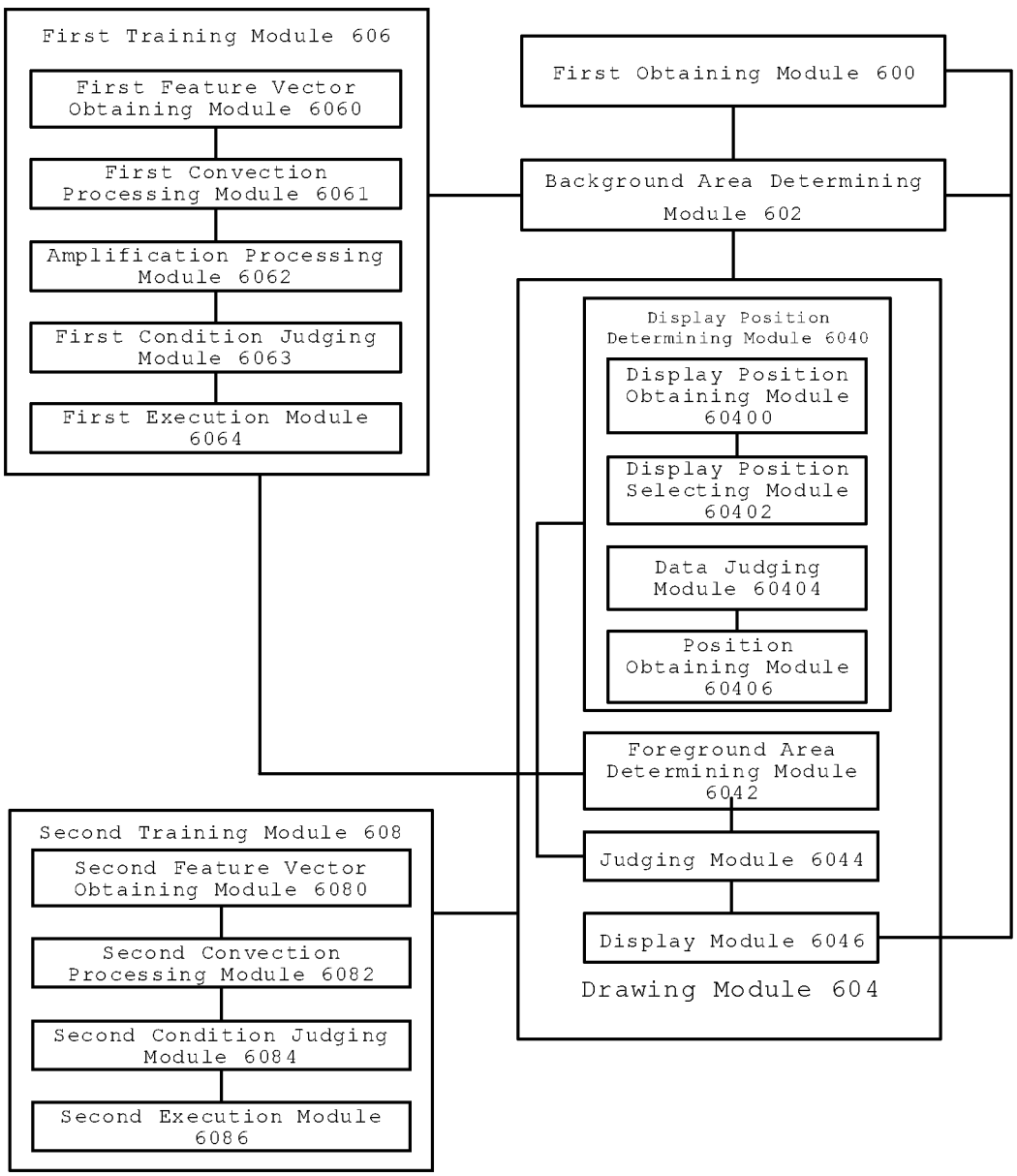
FIG. 7 is a structure block diagram of another embodiment of the apparatus for processing the video image in the present application.

FIG. 7 is a structure block diagram of another embodiment of the apparatus for processing the video image in the present application. As shown in FIG. 7, compared with the embodiment shown in FIG. 6, in the apparatus for processing the video image, the drawing module 604 includes: a display position determining module 6040 for determining a display position of the business object in the video image; a foreground area determining module 6042 for determining a foreground area of the video image; a judging module 6044 for judging whether there is an overlapping portion between the business object and the foreground area based on the display position; and a display module 6046 for drawing, if there is an overlapping portion between the business object and the foreground area, a portion excluding the overlapping portion in the business object in the background area by means of computer graphics.

Optionally, the background area determining module 602 is configured for determining the background area of the video image through a pre-trained first convolutional neural network model.

Optionally, the apparatus for processing the video image in the present embodiment may further include a first training module 606 for training the first convolutional neural network model.

In an optional example, the first training module 606 may include: a first feature vector obtaining module 6060 for obtaining a first feature vector of a first sample image by using the first convolutional neural network model, wherein the first sample image is a sample image containing foreground tag information and background tag information; a first convolution processing module 6061 for performing convolution processing on the first feature vector by using the first convolutional neural network model to obtain a convolution result of the first feature vector; an amplification processing module 6062 for performing amplification processing on the convolution result of the first feature vector; a first condition judging module 6063 for judging whether the amplified convolution result of the first feature vector meets a convolution convergence condition; and a first execution module 6064 for completing the training of the first convolutional neural network model if the amplified convolution result of the first feature vector meets the convolution convergence condition, and if the amplified convolution result of the first feature vector does not meet the convolution convergence condition, adjusting network parameter(s) of the first convolutional neural network model based on the amplified convolution result of the first feature vector and performing iterative training on the first convolutional neural network model according to the adjusted network parameter(s) of the first convolutional neural network model until the convolution result of the first feature vector after the iterative training meets the convolution convergence condition.

Optionally, the amplification processing module 6064 is configured for amplifying the convolution result of the first feature vector by performing bilinear interpolation on the convolution result of the first feature vector.

Optionally, the amplification processing module 6064 is configured for amplifying the convolution result of the first feature vector until a size of an image corresponding to the amplified convolution result of the first feature vector is consistent with a size of a raw image.

Optionally, the first condition judging module 6066 is configured for computing a loss value of the amplified convolution result of the first feature vector and a predetermined standard output feature vector by using a set loss function, and judging whether the amplified convolution result of the first feature vector meets the convolution convergence condition according to the loss value.

Optionally, referring to FIG. 7 again, the first training module 606 may further include: a prediction module 6065 for obtaining test sample images, and performing prediction of foreground/background area for the test sample images by using the trained first convolutional neural network model; a checking module 6066 for checking whether the predicted foreground/background area is correct; and a retraining module 6067 for re-training the first convolutional neural network model using the test sample images if the check result of the checking module is incorrect.

Optionally, the retraining module 6067 is configured for obtaining a sample image from the test sample images of which a foreground/background area is incorrectly predicted, and re-training the first convolutional neural network model using the sample image that is incorrectly predicted, wherein the sample image that is incorrectly predicted contains foreground information and background information.

Optionally, referring to FIG. 7 again, the first training module 606 may further include a video stream module 6068 for inputting a video stream including multiple frames of sample images into the first convolutional neural network model before the first feature vector obtaining module obtains the first feature vector of the first sample image.

Optionally, referring to FIG. 7 again, the first training module 606 may further include a tagging module 6069 for determining multiple key frames of images of the video stream as a sample image before the video stream module inputs the video stream including multiple frames of sample images into the first convolutional neural network model, and tagging the foreground area and the background area of the sample image.

Optionally, the first convolutional neural network model in each embodiment of the present application may include a full convolutional neural network model.

Optionally, the display position determining module 6040 is configured for determining the display position of the business object in the video image according to a set rule, wherein the set rule includes: a preset business object is at a set display position of the video image; or, the display position determining module 6040 determines the display position of the business object in the video image according to action detection data of a target object in the foreground area.

Optionally, the display position determining module 6040 is configured for determining the display position of the business object in the video image by the pre-trained second convolutional neural network model according to the action detection data of the target object in the foreground area.

Optionally, the apparatus for processing the video image in the present embodiment may further include a second training module 608 for training the second convolutional neural network model.

In one optional example, the second training module 608 may include: a second feature vector obtaining module 6080 for obtaining a second feature vector of a second sample image by using the second convolutional neural network model, wherein the second feature vector contains position information and/or confidence information of the business object in the second sample image, as well as a target object feature vector of a target object in the second sample image; a second convolution processing module 6082 for performing convolution processing on the second feature vector by using the second convolutional neural network model to obtain a convolution result of the second feature vector; a second condition judging module 6084 for judging whether the position information and/or the confidence information of the corresponding business object in the convolution result of the second feature vector meets a business object convergence condition, and judging whether the target object feature vector in the convolution result of the second feature vector meets a target object convergence condition; and a second execution module 6086 for completing the training on the second convolutional neural network model if the position information and/or the confidence information of the corresponding business object in the convolution result of the second feature vector meets the business object convergence condition, and the target object feature vector in the convolution result of the second feature vector meets the target object convergence condition; otherwise, adjusting network parameters of the second convolutional neural network model and performing iterative training on the second convolutional neural network model according to the adjusted network parameters of the second convolutional neural network model until both the position information and/or the confidence information of the business object and the target object feature vector after the iterative training meet the corresponding convergence conditions.

Optionally, the display position determining module 6040 is configured for determining the display position of the business object in the video image according to action detection data of the target object in the foreground area and the type of the business object.

Optionally, the display position determining module 6040 includes: a display position obtaining module 60400 for obtaining a plurality of display positions of the business object in the video image are obtained according to the action detection data of the target object in the foreground area and the type of the business object; and a display position selecting module 604202 for selecting at least one display position from a plurality of display positions as a final display position of the business object in the video image.

Optionally, the display position determining module 6040 includes: a data judging module 60404 for judging whether the action detection data of the target object in the foreground area matches the preset action data; and a position obtaining module 60404 for obtaining in accordance with a corresponding relationship between pre-stored action data and the display position, if the action detection data of the target object in the foreground area matches the preset action data, a target display position corresponding to the preset action data as the display position of the business object in the video image.

Optionally, the obtaining module 600 is configured for obtaining the business object to be displayed from a predetermined storage position, or receiving the business object from a video source.

Optionally, the business object, for example, may be but not limited to any one or more of: a target video, a target image, and a special effect containing semantic information; and the video image may include a static image or a live video image.

Optionally, the target specific effect may contain any one or more forms of following special effects of advertisement information: a two-dimensional paster special effect, a three-dimensional special effect, a particle special effect, etc.

Optionally, the foreground area of the live video image is an area where a human character is located.

Optionally, the background area of the live video image includes at least a local area excluding an area where a human character is located.

Optionally, the action detection data of the target object include any one or more of blink data, mouth opening data, head nodding data, head waving data, kissing data, smiling data, hand waving data, scissor hand data, fisting data, hand-on-chin data, thumb data, pistol posture data, OK hand data etc.

The apparatus for processing the video image in the present embodiment is configured for implementing the corresponding method for processing the video image in the multiple method embodiments mentioned above, and has the beneficial effects of the corresponding method embodiments, and no more detail is provided here.

Besides, the apparatus for processing the video image in the present embodiment may be arranged in an appropriate electronic device including but not limited to a mobile terminal, a PC, a server, etc.

Figure 8:
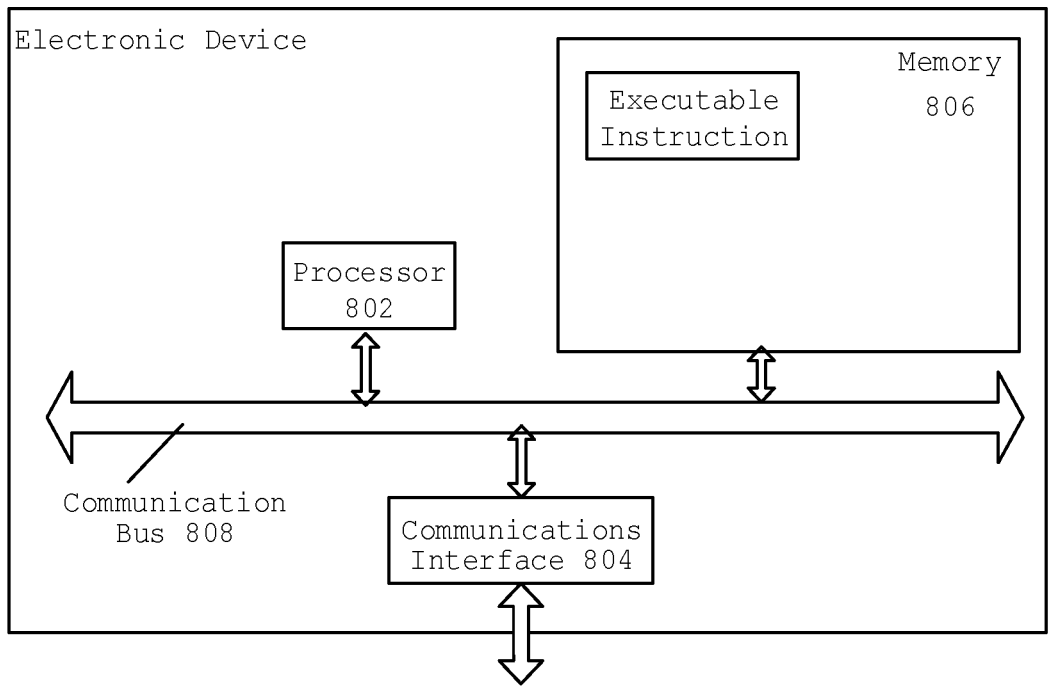
FIG. 8 is a structure diagram of one embodiment of the electronic device in the present application.

FIG. 8 is a structure block diagram of another embodiment of the apparatus for processing the video image in the present application. The embodiments of the present application do not limit the specific implementation of the electronic device. As shown in FIG. 8, the electronic device may include: a processor 802, a communications interface 804, a memory 806, and a communication bus 808, wherein:

The processor 802, the communications interface 804 and the memory 806 communicate with one another through the communication bus 808.

The communications interface 804 is configured for communicating with network elements of other devices such as other clients or servers, etc.

The processor 802 may be a central processing unit (CPU), or an application specific integrated circuit (ASIC), or one or more integrated circuits configured to implement the embodiments of the present application, or a graphics processing unit (GPU). The terminal device includes one or more processors which may be of the same type, such as one or more CPUs, or one or more GPUs; and the processes may be of different types, such as one or more CPUs and one or more GPUs.

The memory 806 is configured for at least one executable instruction which enable the processor 802 to execute operations corresponding to a method for displaying the business object in the video image in any embodiment of the present application. The memory 806 may include a high-speed random access memory (RAM), and may further include a non-volatile memory, for example, at least one magnetic disc memory.

As will be appreciated by one skilled in the art, the present disclosure may be embodied as a computer program product. Accordingly, the present disclosure may take the form of an entirely hardware embodiment, an entirely software embodiment (including firmware, resident software, microcode, etc.) or an embodiment combining software and hardware. Furthermore, the present disclosure may take the form of a computer program product embodied in any tangible medium of expression having computer-usable program embodied in the medium.

Figure 9:
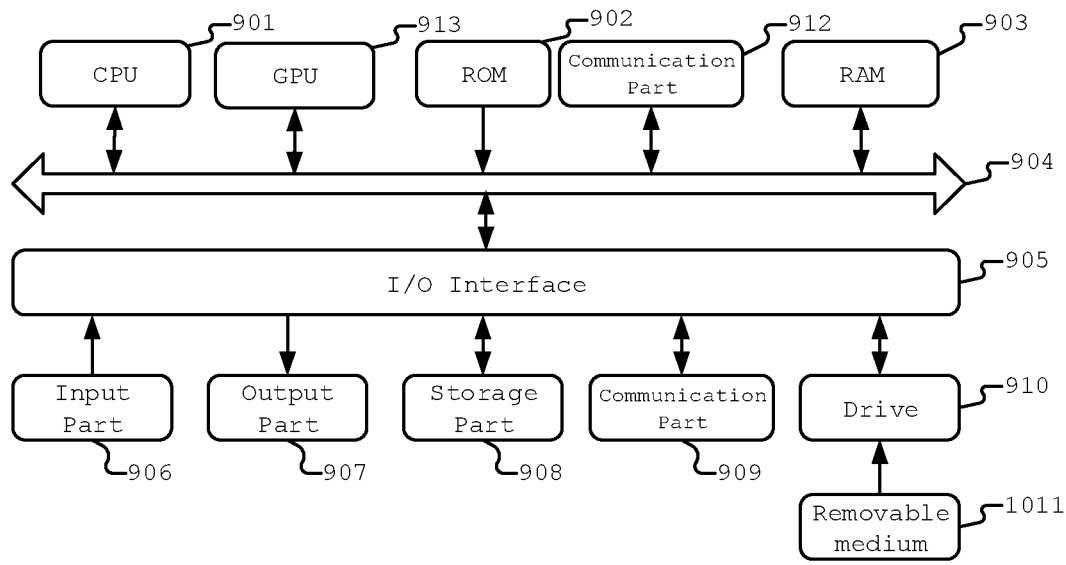
FIG. 9 is a structure diagram of another embodiment of the electronic device in the present application.

FIG. 9 is a structure diagram of an embodiment of the electronic device in the present application. Hereinafter, referring to FIG. 9, it shows a structure diagram of the electronic device suitable for implementing the terminal device or the server in the embodiments of the present application. As shown in FIG. 9, the electronic device includes one or more processors, one or more communication parts, etc. Wherein the at least one or more processes are, such as, for example, one or more central processing units (CPU) 901, and/or one or more graphics processing units (GPU) 913; and the processor may execute various appropriate actions and processing according to an executable instruction stored in a read-only memory (ROM) 902 or an executable instruction loaded into the random access memory (RAM) 903 from a storage portion 908. The communication part 912 includes but not limited to a network card. The network card may include but not limited to an IB (Infiniband) network card. The processor may communicate with the read-only memory 902 and/or the random access memory 903 to execute the executable instruction. The processor is connected to the communication part 912 through a bus 904, and communicates with other target device through the communication part 912, thereby completing operation(s) corresponding to the method for processing any video image provided by the embodiments of the present application. For example, the video image to be processed and the business object to be displayed are obtained, the background area of the video image is determined, and the business object in the background area of the video image is drawn by computer graphics.

Besides, various programs and data required by operation of the apparatus are stored in the RAM 903. CPU 901, ROM 902 and RAM 903 are connected with one another through the bus 904. The ROM 902 is an optional module in the presence of the RAM 903. The RAM 903 stores an executable instruction, or writes the executable instruction into the ROM 902 during operation, and the executable instruction enables the processor 901 to execute corresponding operation of the method for processing the video image. An input/output (I/O) interface 905 is also connected to the bus 904. The communication part 912 may be set integrally, or may be set to have a plurality of sub-modules (e.g., a plurality of IB network cards) and is on a bus link.

The following parts are connected to the I/O interface 905: an input part 906 including a keyboard, a mouse etc.; an output part 907 including a cathode ray tube (CRT), a liquid crystal display (LCD), a loudspeaker and/or the like, for example; a storage part 908 including a hard disk etc.; and a communication part 909 including a network interface card such as an LAN card, a modem etc. The communication part 909 executes communication processing through a network such as Internet. A driver 911 is also connected to the I/O interface 905 according to needs. A detachable medium 910 such as a magnetic disk, an optical disk, a magneto-optical disk, a semiconductor memory etc. is installed on the driver 911 according to needs to facilitate reading of a computer program, which is installed in the storage part 908, from the detachable medium.

It should be noted that a framework shown in FIG. 9 is only an optional implementation, and in a specific practical process, a number and types of components shown in FIG. 9 are selected, deleted, increased or replaced according to actual needs. In arrangement of different functional components, an implementation such as separate arrangement or integrated arrangement may also be adopted. For example, the GPU and CPU may be arranged separately, or the GPU may be integrated onto the CPU, and the communication part may be arranged separately or may be integrated onto the CPU or GPU, etc. All these alternative implementations fall into the protection scope of disclosure of the present application.

Especially, according to the embodiments disclosed by the present disclosure, a process described above by referring to the flow diagrams may be implemented as a computer software program. For example, the embodiment of the present disclosure includes a computer program product which includes a computer program physically contained in a machine readable medium. The computer program contains a program code for executing the method shown by a flow diagram, and the program code may include a corresponding instruction for correspondingly executing the method steps provided by the embodiment of the present application, such as, for example, an instruction for obtaining the video image to be processed and the business object to be displayed, an instruction for determining the background area of the video image, and an instruction for drawing the business object in the background area of the video image by means of computer graphics.

In addition, a computer program is further provided by the embodiment of the present application, and includes a computer readable code. The program code includes a computer operation instruction, and when the computer readable code is operated on the device, the processor in the device executes the instruction for implementing each step of the method for processing the video image in any embodiment of the present application.

According to the embodiments of the present application, the process described above by referring to the flow diagrams may be implemented as a computer software program. For example, the embodiment of the present application includes a computer program product which includes a computer program physically contained in a machine readable medium. The computer program contains a program code for executing the method shown by the flow diagram, and the program code may include a corresponding instruction for correspondingly executing the method steps provided by the embodiment of the present application, such as, for example, an instruction for obtaining the video image to be processed and the business object to be displayed, an instruction for determining the background area of the video image, and an instruction for drawing the business object in the background area of the video image by means of computer graphics.

Each embodiment in the specification is described in a progressive manner, illustration of each embodiment focuses on its difference from other embodiments, with same or similar parts of each embodiment being referred to each other. For the embodiments of an apparatus, a device, a program, a storage medium etc., it is relatively simple to be described because of their basic correspondence to the method embodiments; and for relevant parts, see the part describing the method embodiments.

The method and apparatus of the present application may be implemented in many ways. For example, the method and apparatus of the present application may be implemented through software, hardware and firmware, or any combination of the software, the hardware and the firmware. Each component/step described in the embodiment of the present application may be split into more components/steps according to the needs of implementation, or two or more components/steps or partial operations of the components/steps are combined into new components/steps, so as to achieve the purpose of the embodiment of the present application. The above sequence of the steps of the method is for description only, and the steps of the method of the present application are not limited to the sequence specifically described above, unless they are especially described in other ways. Besides, in some embodiments, the present application may also be implemented as programs recorded in a medium, and these programs include a machine-readable instruction for implementing the method according to the present application. Therefore, the present application also covers a recording medium storing a program for executing the method according to the present application.

The above method according to the embodiments of the present application may be implemented in hardware and firmware, or implemented as software or a computer code capable of being stored in a recording medium (such as a CD ROM, an RAM, a floppy disk, a hard disk or a magneto-optical disk), or implemented as a computer code which is downloaded through a network, originally stored in a remote recording medium or a non-transient machine readable medium, and is going to be stored in a local recording medium, so that the method described herein may be processed by such software stored on the recording medium using a general-purpose computer, a special processor or programmable or special hardware (such as ASIC or FPGA). It should be appreciated that the computer, the processor, a microprocessor controller or the programmable hardware includes a storage component (e.g., an RAM, an ROM, a flash memory, etc.) capable of storing or receiving software or a computer code, and when the software or computer code is accessed and executed by the computer, the processor or the hardware, the processing method described herein is implemented. Besides, when the general-purpose computer accesses the code for implementing the processing shown here, the execution of the code converts the general-purpose computer into a dedicated computer for executing the processing shown here.

Those of ordinary skill in the art may realize that the units and method steps of each example described in combination with the embodiments disclosed in the present disclosure may be implemented by electronic hardware, or by a combination of computer software and electronic hardware. Whether these functions are executed by hardware or software depends on a specific application and design constraint conditions of the technical solution. Professionals may use different methods to implement the described functions for each specific application, but such implementation should not be considered beyond the scope of the embodiments of the present application.

The above implementations are used only to illustrate the embodiments of the present application, rather than limiting the embodiments of the present application. Those of ordinary skills in related art may also make various changes and variations without departing from the scope of the embodiments of the present application, so that all equivalent technical solutions also fall into the scope of the embodiments of the present application. The patent protection scope of the embodiments of the present application shall be defined by the claims.

What is claimed is:

1. A method for processing a video image, comprising:
obtaining a video image to be processed and a business object to be displayed, the video image comprising a background area and a foreground area comprising a target object non-overlapping with the background area;
determining the background area of the video image;
determining a display position of the business object in the video image;
determining whether the business object overlaps with the target object in the foreground area based on the display position; and
in response to determining that the business object overlaps with the target object, drawing a portion of the business object overlapping with the background area of the video image by means of computer graphics, wherein the entire target object is presented without presenting each portion of the business object overlapping with the target object.

2. The method according to claim 1, wherein the video image comprises a plurality of display layers, and the drawing the portion of the business object overlapping with the background area of the video image by means of computer graphics comprises:
   placing a display layer of the business object below a display layer of the foreground area.

3. The method according to claim 1, wherein the drawing the portion of the business object overlapping with the background area of the video image by means of computer graphics comprises:
   drawing the portion of the business object overlapping with the background area by means of computer graphics to enable the business object to cover raw content of the background area.

4. The method according to claim 1, wherein the determining the background area of the video image comprises:
   determining the background area of the video image by a pre-trained first convolutional neural network model.

5. The method according to claim 4, wherein the determining the background area of the video image by a pre-trained first convolutional neural network model comprises:
   obtaining a first image feature vector of the video image using the first convolutional neural network model;
   performing convolution processing on the first image feature vector using the first convolutional neural network model to obtain a convolution result of the first image feature vector;
   performing amplification processing on the convolution result of the first image feature vector; and
   determining the background area based on the amplified convolution result of the first image feature vector.

6. The method according to claim 4, wherein pre-training of the first convolutional neural network model comprises:
   obtaining a first feature vector of a first sample image using the first convolutional neural network model, wherein the first sample image is a sample image containing foreground tag information and background tag information;
   performing convolution processing on the first feature vector using the first convolutional neural network model to obtain a convolution result of the first feature vector;
   performing amplification processing on the convolution result of the first feature vector;
   judging whether the amplified convolution result of the first feature vector meets a convolution convergence condition;
   if the amplified convolution result of the first feature vector meets the convolution convergence condition, completing training of the first convolutional neural network model; and
   if the amplified convolution result of the first feature vector does not meet the convolution convergence condition, adjusting a network parameter of the first convolutional neural network model based on the amplified convolution result of the first feature vector, and performing iterative training on the first convolutional neural network model according to the adjusted network parameter of the first convolutional neural network model, until the convolution result of the first feature vector after the iterative training meets the convolution convergence condition.

7. The method according to claim 1, wherein the determining the display position of the business object in the video image comprises:
   performing an action detection on the target object in the foreground area to obtain action detection data; and
   determining the display position of the business object in the video image according to the action detection data of the target object in the foreground area.

8. The method according to claim 7, wherein the determining the display position of the business object in the video image according to the action detection data of the target object in the foreground area comprises:
   determining the display position of the business object in the video image by a pre-trained second convolutional neural network model according to the action detection data of the target object in the foreground area.

9. The method according to claim 8, wherein pre-training of the second convolutional neural network model comprises:
   obtaining a second feature vector of a second sample image using the second convolutional neural network model, wherein the second feature vector contains position information and/or confidence information of the business object in the second sample image, as well as a target object feature vector of a target object in the second sample image;
   performing convolution processing on the second feature vector using the second convolutional neural network model to obtain a convolution result of the second feature vector;
   judging whether position information and/or confidence information of a corresponding business object in the convolution result of the second feature vector meet a business object convergence condition, and judging whether the target object feature vector in the convolution result of the second feature vector meets a target object convergence condition;
   if the both are met, completing training of the second convolutional neural network model; and
   otherwise, adjusting a network parameter of the second convolutional neural network model and performing iterative training on the second convolutional neural network model according to the adjusted the network parameter of the second convolutional neural network model, until the position information and/or the confidence information of the business object after the iterative training as well as the target object feature vector after the iterative training meet a corresponding convergence condition.

10. The method according to claim 7, wherein the determining the display position of the business object in the video image according to the action detection data of the target object in the foreground area comprises:
   determining the display position of the business object in the video image according to action detection data of the target object in the foreground area and according to a type of the business object.

11. The method according to claim 7, wherein the determining the display position of the business object in the video image according to the action detection data of the target object in the foreground area comprises:
   judging whether the action detection data of the target object in the foreground area matches preset action data; and
   if the action detection data of the target object in the foreground area matches the preset action data, obtaining, from a corresponding relationship between pre-stored action data and display position, a target display position corresponding to the preset action data as the display position of the business object in the video image.

12. An apparatus for processing a video image, comprising:
- a processor; and
- instructions to cause the processor to perform operations, the operations comprising:
  - obtaining a video image to be processed and a business object to be displayed, the video image comprising a background area and a foreground area comprising a target object non-overlapping with the background area;
  - determining the background area of the video image;
  - determining a display position of the business object in the video image;
  - determining whether the business object overlaps with the target object in the foreground area based on the display position; and
  - in response to determining that the business object overlaps with the target object: drawing a portion of the business object overlapping with the background area of the video image by means of computer graphic, wherein the entire target object is presented without presenting each portion of the business object overlapping with the target objects.

13. The apparatus according to claim 12, wherein the video image comprises a plurality of display layers, and the drawing the portion of the business object overlapping with the background area of the video image by means of computer graphics comprises:
- placing a display layer of the business object below a display layer of the foreground area.

14. The apparatus according to claim 13, wherein the determining the display position of the business object in the video image comprises:
- performing an action detection on the target object in the foreground area to obtain action detection data; and
- determining the display position of the business object in the video image according to the action detection data of the target object in the foreground area.

15. The apparatus according to claim 14, wherein the determining the display position of the business object in the video image according to the action detection data of the target object in the foreground area comprises:
- determining the display position of the business object in the video image by a pre-trained second convolutional neural network model according to the action detection data of the target object in the foreground area.

16. The apparatus according to claim 15, wherein pre-training of the second convolutional neural network model comprises:
- obtaining a second feature vector of a second sample image using the second convolutional neural network model, wherein the second feature vector contains position information and/or confidence information of the business object in the second sample image, as well as a target object feature vector of a target object in the second sample image;
- performing convolution processing on the second feature vector using the second convolutional neural network model to obtain a convolution result of the second feature vector;
- judging whether position information and/or confidence information of a corresponding business object in the convolution result of the second feature vector meet a business object convergence condition, and judging whether the target object feature vector in the convolution result of the second feature vector meets a target object convergence condition; and
- completing the training on the second convolutional neural network model if the corresponding position information and/or confidence information in the convolution result of the second feature vector meet the business object convergence condition, and the target object feature vector in the convolution result of the second feature vector meets the target object convergence condition; otherwise, adjusting a network parameter of the second convolutional neural network model, and performing iterative training on the second convolutional neural network model according to the adjusted the network parameter of the second convolutional neural network model until the position information and/or the confidence information of the business object after the iterative training as well as the target object feature vector after the iterative training meet a corresponding convergence condition.

17. The apparatus according to claim 12, wherein the determining the background area of the video image comprises:
- determining the background area of the video image by a pre-trained first convolutional neural network model.

18. The apparatus according to claim 17, wherein pre-training of the first convolutional neural network model comprises:
- obtaining a first feature vector of a first sample image using the first convolutional neural network model, wherein the first sample image is a sample image containing foreground tag information and background tag information;
- performing convolution processing on the first feature vector using the first convolutional neural network model to obtain a convolution result of the first feature vector;
- performing amplification processing on the convolution result of the first feature vector;
- judging whether the amplified convolution result of the first feature vector meets a convolution convergence condition; and
- completing the training on the first convolutional neural network model if the amplified convolution result of the first feature vector meets the convolution convergence condition; and if the amplified convolution result of the first feature vector does not meet the convolution convergence condition, adjusting a network parameter of the first convolutional neural network model based on the amplified convolution result of the first feature vector, and performing iterative training on the first convolutional neural network model according to the adjusted network parameter of the first convolutional neural network model, until the convolution result of the first feature vector after the iterative training meets the convolution convergence condition.

19. A computer program product, comprising a computer readable code; when the computer readable code runs in a device, a processor in the device executes an executable instruction for realizing the method for processing a video image according to claim 1.

* * * * *

UNITED STATES PATENT AND TRADEMARK OFFICE
CERTIFICATE OF CORRECTION

PATENT NO. : 10,580,179 B2
APPLICATION NO. : 15/845802
DATED : March 3, 2020
INVENTOR(S) : Qing Luan et al.

Page 1 of 1

It is certified that error appears in the above-identified patent and that said Letters Patent is hereby corrected as shown below:

On the Title Page

Item (30) Foreign Application Priority Data, please add Aug. 19, 2016 (CN) ...... 2016 1 0694814.9.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*